United States Patent
Park et al.

(10) Patent No.: US 11,523,110 B2
(45) Date of Patent: *Dec. 6, 2022

(54) IMAGE ENCODING METHOD AND APPARATUS, AND IMAGE DECODING METHOD AND APPARATUS

(71) Applicant: SAMSUNG ELECTRONICS CO., LTD., Suwon-si (KR)

(72) Inventors: Min-woo Park, Yongin-si (KR); Min-soo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,535

(22) Filed: Jul. 14, 2021

(65) Prior Publication Data

US 2021/0344911 A1 Nov. 4, 2021

Related U.S. Application Data

(63) Continuation of application No. 16/627,551, filed as application No. PCT/KR2018/007701 on Jul. 6, 2018, now Pat. No. 11,095,884.

(Continued)

(51) Int. Cl.
*H04N 19/107* (2014.01)
*H04N 19/119* (2014.01)
(Continued)

(52) U.S. Cl.
CPC ......... *H04N 19/107* (2014.11); *H04N 19/119* (2014.11); *H04N 19/159* (2014.11); *H04N 19/176* (2014.11)

(58) Field of Classification Search
None
See application file for complete search history.

(56) References Cited

U.S. PATENT DOCUMENTS

| 8,155,191 | B2 | 4/2012 | Lu et al. |
| 9,843,804 | B2 * | 12/2017 | An ............ H04N 19/96 |
| 10,506,231 | B2 | 12/2019 | An et al. |

FOREIGN PATENT DOCUMENTS

| CN | 101099394 A | 1/2008 |
| KR | 10-2017-0077203 A | 7/2017 |
| WO | 2006052577 A2 | 5/2006 |
| WO | 2016090568 A1 | 6/2016 |

OTHER PUBLICATIONS

Communication dated Apr. 28, 2020, from the European Patent Office in counterpart European Application No. 18828575.3.

(Continued)

*Primary Examiner* — Lindsay J Uhl
(74) *Attorney, Agent, or Firm* — Sughrue Mion, PLLC

(57) ABSTRACT

An image decoding method includes: splitting a first block included in an image on the basis of at least one of a split type and a split direction of the first block to determine at least one second block from the first block; determining one of a prediction mode of the at least one second block and whether to split the at least one second block on the basis of at least one of a size and a shape of the determined at least one second block; obtaining a prediction block of a block included in the at least one second block on the basis of one of the determined prediction mode and whether to split the at least one second block; and restoring the block included in the at least one second block on the basis of the prediction block of the block included in the at least one second block. Here, the split type represents one of binary-split, tri-split, and quad-split.

3 Claims, 21 Drawing Sheets

Related U.S. Application Data

(60) Provisional application No. 62/529,156, filed on Jul. 6, 2017.

(51) Int. Cl.
  *H04N 19/159* (2014.01)
  *H04N 19/176* (2014.01)

(56) References Cited

OTHER PUBLICATIONS

Xiang Li et al. "Multi-Type-Tree" Joint Video Exploration Team (JVET) of ITU-T SG 16 WP 3 and ISO/IEC JTC 1/SC29/WG 11, 4th Meeting: Chengdu, CN, Oct. 15-21, 2016, Document: JVET-D0117rl, (3 pages total) XP030150367.

Yi-Hsin Huang et al. "Fast Decision of Block Size, Prediction Mode, and Intra Block for H.264 Intra Prediction" IEEE Transactions on Circuitsand Systems for Video Technology, vol. 20, No. 8, Aug. 2010, (pp. 1122-1132) XP011315552.

Jia Zhu et al. "Fast prediction mode decision with hadamard transform based rate-distortion cost estimation for HEVC intra coding" 2013 IEEE International Conference on Image Processing, Sep. 15, 2013, (pp. 1977-1981) XP032966019.

Communication dated Apr. 6, 2022 issued by the National Intellectual Property Administration, PRC of English China in CN Application No. 201880045227.4.

Communication dated Jul. 8, 2021, issued by the Korean Intellectual Property Office in Korean Application No. 10-2020-7000380.

\* cited by examiner

FIG. 4

```
if(current slice type is Inter slice && block size != 4X4)
   skip_flag
else // block size == 4x4 or current slice is intra slice
   skip_flag = NO_SKIP if(current slice type is Inter slice && block size != 4X4)
   pred_mode_flag
else // block size == 4x4 or current slice is intra slice
   pred_mode_flag = MODE_INTRA
```

FIG. 15

| BLOCK SHAPE<br>DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

IMAGE ENCODING METHOD AND APPARATUS, AND IMAGE DECODING METHOD AND APPARATUS

CROSS-REFERENCE TO RELATED PATENT APPLICATION

This application is a continuation application of U.S. patent application Ser. No. 16/627,551, filed Dec. 30, 2019, which is a National Stage Entry of International Application Serial No. PCT/KR2018/007701, filed Jul. 6, 2018, which claims priority to U.S. Provisional Application No. 62/529,156, filed Jul. 6, 2017, the disclosures of which are incorporated herein in their entirety by reference.

TECHNICAL FIELD

A method and apparatus according to an embodiment may encode or decode an image by using various shapes of coding units included in the image. A method and apparatus according to an embodiment include an image encoding/decoding method and apparatus for obtaining, on the basis of at least one of a size and shape of a block, a prediction block of a block included in the block.

BACKGROUND ART

With the development and spread of hardware capable of reproducing and storing high-resolution or high-definition image content, the need for a codec that effectively encodes or decodes high-resolution or high-definition image content is increasing. Encoded image content is reproduced by being decoded. Recently, methods for effectively compressing such high-resolution or high-definition image content have been performed. For example, an efficient image compressing method is being performed through a process of processing an image to be encoded via an arbitrary method.

To compress an image, various data units may be used, and an inclusion relationship may exist between the data units. To determine the sizes of data units that are used for image compression, data units may be split by various methods, and optimized data units may be determined according to the characteristics of images so that encoding or decoding of the images may be performed.

DESCRIPTION OF EMBODIMENTS

Solution to Problem

An image decoding method according to an embodiment includes: splitting a first block included in an image on the basis of at least one of a split type and a split direction of the first block to determine at least one second block from the first block; determining one of a prediction mode of the at least one second block and whether to split the at least one second block on the basis of at least one of a size and a shape of the determined at least one second block; obtaining a prediction block of a block included in the at least one second block on the basis of one of the determined prediction mode and whether to split the at least one second block; and reconstructing the block included in the at least one second block on the basis of the prediction block of the block included in the at least one second block, wherein the split type represents one of binary-split, tri-split, and quad-split.

The determining of the one of the prediction mode of the at least one second block and whether to split the at least one second block on the basis of the at least one of the size and the shape of the determined at least one second block may include determining an intra mode as the prediction mode of the at least one second block when the size of the at least one second block is smaller than or equal to a predetermined size.

The determining of the one of the prediction mode of the at least one second block and whether to split the at least one second block on the basis of the at least one of the size and the shape of the determined at least one second block may include determining an inter mode as the prediction mode of the at least one second block when the size of the at least one second block is larger than or equal to a predetermined size.

The determining of the one of the prediction mode of the at least one second block and whether to split the at least one second block on the basis of the at least one of the size and the shape of the determined at least one second block may include determining an intra mode as the prediction mode of the at least one second block when an area of the at least one second block is smaller than or equal to a predetermined value.

The determining of the one of the prediction mode of the at least one second block and whether to split the at least one second block on the basis of the at least one of the size and the shape of the determined at least one second block may include determining an inter mode as the prediction mode of the at least one second block when an area of the at least one second block is greater than or equal to a predetermined value.

The determining of the one of the prediction mode of the at least one second block and whether to split the at least one second block on the basis of the at least one of the size and the shape of the determined at least one second block may include: determining an intra mode as the prediction mode of the at least one second block when a sum of a height and a width of the at least one second block is smaller than or equal to a predetermined first value; and determining an inter mode as the prediction mode of the at least one second block when the sum of the height and the width of the at least one second block is greater than a predetermined second value.

The determining of the one of the prediction mode of the at least one second block and whether to split the at least one second block on the basis of the at least one of the size and the shape of the determined at least one second block may include determining an inter mode as the prediction mode of the at least one second block when at least one of a height and a width of the determined at least one second block is greater than or equal to a predetermined value.

The determining of the one of the prediction mode of the at least one second block and whether to split the at least one second block on the basis of the at least one of the size and the shape of the determined at least one second block may include determining an intra mode as the prediction mode of the at least one second block when at least one of a height and a width of the determined at least one second block is smaller than or equal to a predetermined value.

The determining of the one of the prediction mode of the at least one second block and whether to split the at least one second block on the basis of the at least one of the size and the shape of the determined at least one second block may include determining a prediction mode of the at least one second block on the basis of at least one of whether the at least one second block is a non-square or a square and a ratio of a height and a width of the at least one second block.

The determining of the one of the prediction mode of the at least one second block and whether to split the at least one second block on the basis of the at least one of the size and the shape of the determined at least one second block may include determining that the at least one second block is split when a slice including the at least one second block is an intra slice and a size of the at least one second block is larger than a predetermined size, and the obtaining of the prediction block of the block included in the at least one second block on the basis of the at least one of the determined prediction mode and whether to split the at least one second block may include: splitting the second block on the basis of at least one of a predetermined split type and a predetermined split direction to determine at least one third block when it is determined that the at least one second block is split; and obtaining a prediction block of the at least one third block when the at least one third block is smaller than or equal to the predetermined size.

An image decoding apparatus according to an embodiment includes: a predictor configured to split a first block included in an image on the basis of at least one of a split type and a split direction of the first block to determine at least one second block from the first block, to determine one of a prediction mode of the at least one second block and whether to split the at least one second block on the basis of at least one of a size and a shape of the determined at least one second block, and to obtain a prediction block of a block included in the at least one second block on the basis of one of the determined prediction mode and whether to split the at least one second block; and an image decoder configured to reconstruct the block included in the at least one second block on the basis of the prediction block of the block included in the at least one second block, wherein the split type represents one of binary-split, tri-split, and quad-split.

An image encoding method according to an embodiment includes: splitting a first block included in an image on the basis of at least one of a split type and a split direction for the first block to determine at least one second block from the first block; determining one of a prediction mode of the at least one second block and whether to split the at least one second block on the basis of at least one of a size and a shape of the determined at least one second block; obtaining a prediction block of a block included in the at least one second block on the basis of one of the determined prediction mode and whether to split the at least one second block; and encoding the block included in the at least one second block on the basis of the prediction block of the block included in the at least one second block, wherein the split type represents one of binary-split, tri-split, and quad-split.

The determining of one of the prediction mode of the at least one second block and whether to split the at least one second block on the basis of at least one of the size and the shape of the determined at least one second block may include: determining an intra mode as the prediction mode of the at least one second block when the size of the at least one second block is smaller than or equal to a predetermined first size; and determining an inter mode as the prediction mode of the at least one second block when the size of the at least one second block is larger than or equal to a predetermined second size.

The determining of one of the prediction mode of the at least one second block and whether to split the at least one second block on the basis of at least one of the size and the shape of the determined at least one second block may include determining a prediction mode of the at least one second block on the basis of at least one of whether the at least one second block is a non-square or a square and a ratio of a height and a width of the at least one second block.

The determining of one of the prediction mode of the at least one second block and whether to split the at least one second block on the basis of at least one of the size and the shape of the determined at least one second block may include determining that the at least one second block is split when a slice including the at least one second block is an intra slice and a size of the at least one second block is larger than a predetermined size, and the obtaining of the prediction block of the block included in the at least one second block on the basis of the at least one of the determined prediction mode and whether to split the at least one second block may include: splitting, when it is determined that the at least one second block is split, the second block on the basis of at least one of a predetermined split type and a predetermined split direction to determine at least one third block; and obtaining a prediction block of the at least one third block when the at least one third block is smaller than or equal to the predetermined size.

A computer program for the image decoding method according to an embodiment of the disclosure may be recorded in a computer-readable recording medium.

BRIEF DESCRIPTION OF DRAWINGS

FIG. 4 shows a pseudo code for the image decoding apparatus 100 to determine a prediction mode of a current block on the basis of a size of the current block, according to an embodiment.

FIG. 15 illustrates a process of determining a depth of a coding unit as a shape and size of the coding unit change, when the coding unit is recursively split such that a plurality of coding units are determined, according to an embodiment.

MODE OF DISCLOSURE

Figure 1A:
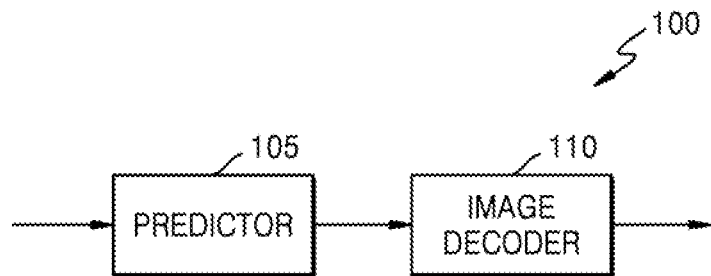
FIG. 1A is a block diagram of an image decoding apparatus according to various embodiments.

Advantages and features of disclosed embodiments and a method of achieving the advantages and features will be apparent by referring to embodiments described below in connection with the accompanying drawings. However, the present disclosure is not restricted by these embodiments but can be implemented in many different forms, and the present embodiments are provided to complete the present disclosure and to allow those having ordinary skill in the art to understand the scope of the disclosure.

Terms used in this specification will be briefly described, and the disclosed embodiments will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms "a," "an," and "the" include plural referents unless the context clearly dictates otherwise.

It will be understood that when a certain part "includes" a certain component, the part does not exclude another component but can further include another component, unless the context clearly dictates otherwise.

As used herein, the terms "portion", "module", or "unit" refers to a software or hardware component that performs predetermined functions. However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes: components such as software components, object-oriented software components, class components, and task components; processors, functions, attributes, procedures, sub-routines, segments of program codes, drivers, firmware, microcodes, circuits, data, databases, data structures, tables, arrays, and variables. Functions provided in the components and "portions", "modules" or "units" may be combined into a smaller number of components and "portions", "modules" and "units", or sub-divided into additional components and "portions", "modules" or "units".

In an embodiment of the present disclosure, the "portion", "module", or "unit" may be implemented as a processor and a memory. The term "processor" should be interpreted in a broad sense to include a general-purpose processor, a central processing unit (CPU), a microprocessor, a digital signal processor (DSP), a controller, a microcontroller, a state machine, etc. In some embodiments, the "processor" may indicate an application-specific integrated circuit (ASIC), a programmable logic device (PLD), a field programmable gate array (FPGA), etc. The term "processor" may indicate a combination of processing devices, such as, for example, a combination of a DSP and a microprocessor, a combination of a plurality of microprocessors, a combination of one or more microprocessors coupled to a DSP core, or a combination of arbitrary other similar components.

The term "memory" should be interpreted in a broad sense to include an arbitrary electronic component capable of storing electronic information. The term "memory" may indicate various types of processor-readable media, such as random access memory (RAM), read only memory (ROM), non-volatile RAM (NVRAM), programmable ROM (PROM), erasable programmable ROM (EPROM), electrically erasable PROM (EEPROM), flash memory, a magnetic or optical data storage device, registers, etc. When a processor can read information from a memory and/or write information in the memory, the memory can be considered to electronically communicate with the processor. A memory integrated into a process electronically communicates with the processor.

Hereinafter, an "image" may represent a static image such as a still image of video, or a moving image, that is, a dynamic image such as video itself.

Hereinafter, a "sample", which is data assigned to a sampling location of an image, means data that is to be processed. For example, pixel values in an image of a spatial region and transform coefficients on a transform region may be samples. A unit including at least one of such samples may be defined as a block.

Hereinafter, a "current block" may mean a block of an image that is encoded or decoded.

Hereinafter, embodiments will be described in detail with reference to the accompanying drawings so that the present disclosure may be readily implemented by one of ordinary skill in the technical field to which the present disclosure pertains. Also, in the drawings, parts irrelevant to the description will be omitted for the simplicity of explanation.

Hereinafter, an image encoding apparatus, an image decoding apparatus, an image encoding method, and an image decoding method, according to an embodiment, will be described with reference to FIGS. 1A to 18. Hereinafter, a method of determining a data unit of an image, according to an embodiment, will be described with reference to FIGS. 5 to 18, and an encoding/decoding method and apparatus for obtaining, on the basis of at least one of a size and shape of a block, a prediction block of a block included in the block on the basis of various types of coding units, according to an embodiment, will be described with reference to FIGS. 1A to 4.

Hereinafter, an encoding/decoding method and apparatus for obtaining, on the basis of at least one of a size and shape of a block, a prediction block of a block included in the block, according to an embodiment of the disclosure, will be described with reference to FIGS. 1A to 4.

FIG. 1A is a block diagram of an image decoding apparatus according to various embodiments.

An image decoding apparatus 100 according to various embodiments may include a predictor 105 and an image decoder 110. The predictor 105 and the image decoder 110 may include at least one processor. Also, the predictor 105 and the image decoder 110 may include a memory storing instructions that are to be executed by the at least one processor. The image decoder 110 may be implemented as separate hardware from the predictor 105, or include the predictor 105.

An obtainer (not shown) may obtain information about a split shape mode of a block from a bitstream. The information about the split shape mode of the block may be syntax element information about the split shape mode of the block. In this case, the information about the split shape mode of the block may include at least one among information about whether to split the block, information about a split direction of the block, and information about a split type of the block. The information about the split direction of the block may be information representing whether to split the block in a horizontal direction or in a vertical direction. The information about the split type of the block may be information representing whether to binary-split the block or to tri-split the block. However, the information about the split shape mode of the block may include information representing whether to quad-split the block. In this case, the information about whether to split the block among the information about the split shape mode may represent that the block is split, the information about the split direction of the block may represent that the block is split in both a horizontal direction and a vertical direction, and the information about the split type of the block may represent that the block is binary-split.

However, the information about the split shape mode may include information representing whether to quad-split the block, the information about whether to split the block among the information about the split shape mode may represent that the block is split, there may be no information about a split direction of the block, and the information about the split type may represent that the block is quad-split.

However, the information about the split shape mode obtained from the bitstream among the information about the split shape mode may include no information about a mode of quad-splitting a block. That is, when a height and width of a current coding unit are equal to a height and width of a largest coding unit, the split shape mode may be set to a mode of quad-splitting a block, and information about a split shape mode may be not obtained from a bitstream. In the remaining cases except for the case, information about a split shape mode obtained from a bitstream may include a split shape mode of binary-splitting a block in a horizontal direction, a split shape mode of tri-splitting a block in a vertical direction, and a mode of splitting no block.

The predictor 105 may split a first block included in an image on the basis of at least one of a split type and a split direction of the first block to determine at least one second block from the first block.

The predictor 105 may split the first block on the basis of information about a split shape mode of the first block to determine at least one second block. That is, when information about whether to split a block among the information about the split shape mode of the first block represents that the first block is split, the predictor 105 may split the first block on the basis of information about a block split type included in the information about the split shape mode of the first block and information about a split direction of a block included in the information about the split shape mode to determine at least one second block.

The predictor 105 may determine one of a prediction mode of the at least one second block and whether to split the at least one second block on the basis of at least one of a size and shape of the at least one second block. When a prediction mode of the second block is determined on the basis of at least one of the size and shape of the second block, the second block may be a block that is no longer split on the basis of information about a split shape mode of the block. Meanwhile, when whether to split the second block is determined on the basis of the size and shape of the second block, the second block may be further split.

When a size of the at least one second block is smaller than or equal to a predetermined size (or smaller than the predetermined size), the predictor 105 may determine an intra mode as a prediction mode of the at least one second block. In this case, the predetermined size may be M×N (M and N are integers). M and N may be multiples of 4. For example, when the size of the at least one second block is smaller than or equal to 4×4 which is a predetermined size (or smaller than the predetermined size), the predictor 105 may determine the intra mode as a prediction mode of the second block.

When the size of the at least one second block is larger than or equal to a predetermined size (or larger than the predetermined size), the predictor 105 may determine an inter mode as a prediction mode of the at least one second block. In this case, the predetermined size may be M×N (M and N are integers). M and N may be multiples of 4. For example, when the size of the at least one second block is larger than or equal to 64×64 which is a predetermined size (or larger than the predetermined size), the predictor 105 may determine the inter mode as a prediction mode of the second block.

When an area of the at least one second block is smaller than or equal to a predetermined value (or smaller than the predetermined value), the predictor 105 may determine the intra mode as a prediction mode of the second block. The area of the second block may be a product of a height and width of the second block. For example, when the area of the second block is smaller than or equal to K (K is an integer) (or smaller than K), the predictor 105 may determine the intra mode as a prediction mode of the at least one second block. For example, when the area of the second block is smaller than or equal to 16, the predictor 105 may determine the intra mode as a prediction mode of the second block. In this case, the size of the second block may be smaller than or equal to 4×4. Alternatively, the size of the second block may be one of 8×2, 2×8, 1×16, and 16×1.

When the area of the at least one second block is greater than or equal to a predetermined value (or greater than the predetermined value), the predictor 105 may determine the inter mode as a prediction mode of the at least one second block. For example, when the area of the second block is greater than or equal to K (or greater than K), the predictor 105 may determine the inter mode as a prediction mode of the second block. For example, when the area of the second block is greater than or equal to 4096, the predictor 105 may determine the inter mode as a prediction mode of the second block. In this case, the size of the second block may be greater than or equal to 64×64. Alternatively, the size of the second block may be one of 128×32, 32×128, 16×256, and 256×16.

When a sum of a height and width of the second block is smaller than or equal to a predetermined value (or smaller than the predetermined value), the predictor 105 may determine the intra mode as a prediction mode of the second block. For example, when the sum of the height and width of the second block is smaller than or equal to K (K is an integer) (or smaller than K), the predictor 105 may determine the intra mode as a prediction mode of the second block.

For example, when the sum of the height and width of the second block is smaller than or equal to 8 (or smaller than 8), the predictor 105 may determine the intra mode as a prediction mode of the second block.

When the sum of the height and width of the second block is greater than or equal to a predetermined value (or greater than the predetermined value), the predictor 105 may determine the inter mode as a prediction mode of the second block. For example, when the sum of the height and width of the second block is greater than or equal to K (K is an integer) (or greater than K), the predictor 105 may determine the inter mode as a prediction mode of the second block. For example, when the sum of the height and width of the second block is greater than or equal to 128 (or greater than 128), the predictor 105 may determine the inter mode as a prediction mode of the second block.

When at least one of the height and width of the at least one second block is smaller than or equal to a predetermined value (or smaller than the predetermined value), the predictor 105 may determine the intra mode as a prediction mode of the second block. For example, when at least one of the height and width of the second block is smaller than or equal to a predetermined value K (K is an integer) (or smaller than the predetermined value K), the predictor 105 may determine the intra mode as a prediction mode of the second block. Herein, K may be a multiple of 4. For example, when each of the height and width of the second block is smaller than or equal to 4, the predictor 105 may determine the intra mode as a prediction mode of the second block.

When at least one of the height and width of the at least one second block is greater than or equal to a predetermined value (or greater than the predetermined value), the predictor 105 may determine the inter mode as a prediction mode of the second block. For example, when at least one of the height and width of the second block is greater than or equal to a predetermined value K (K is an integer) (or greater than the predetermined value K), the predictor 105 may determine the inter mode as a prediction mode of the second block. Herein, K may be a multiple of 4. For example, when each of the height and width of the second block is greater than or equal to 64, the predictor 105 may determine the inter mode as a prediction mode of the second block.

The predictor 105 may determine the intra mode or the inter mode as a prediction mode of the at least one second block on the basis of a shape of the second block. The predictor 105 may determine a prediction mode of the at least one second block on the basis of at least one of whether the at least one second block is a non-square or a square and a ratio of a height and width of the at least one second block. For example, when the at least one second block is a non-square (that is, when the second block is not a square), the predictor 105 may determine a prediction mode of the at least one second block as a predetermined prediction mode. For example, the predetermined prediction mode may be one of the intra mode or the inter mode. In this case, the image decoding apparatus 100 may determine a prediction mode of the second block without obtaining information about a prediction mode of the second block from a bitstream. When the at least one second block is a square, the image decoding apparatus 100 may obtain information about a prediction mode of the at least one second block from a bitstream in order to determine a prediction mode of the at least one second block, and determine a prediction mode of the second block on the basis of the information about the prediction mode of the second block. However, it will be easily understood by one of ordinary skill in the art that, when the at least one second block is a non-square, the predictor 105 may determine a prediction mode of the at least one second block as a predetermined prediction mode without obtaining information about a prediction mode of the second block from a bitstream.

When a ratio of the height and width of the at least one second block is greater than or equal to (or greater than) a predetermined value K1 or smaller than or equal to (or smaller than) a predetermined value K2 (K1 and K2 are integers), the predictor 105 may determine a prediction mode of the second block as a predetermined prediction mode. For example, when the ratio of the height and width of the at least one second block is greater than 0 and smaller than or equal to 0.5 (or smaller than 0.5), the predictor 105 may determine a prediction mode of the second block as a predetermined prediction mode. When the ratio of the height and width of the at least one second block is greater than or equal to 2 (or greater than 2), the predictor 105 may determine a prediction mode of the second block as a predetermined prediction mode.

When the ratio of the height and width of the at least one second block is greater than or equal to 0.5 (or greater than 0.5) and smaller than or equal to 2 (or smaller than 2), the image decoding apparatus 100 may obtain information about a prediction mode of the second block from a bitstream, and determine a prediction mode of the second block on the basis of the information about the prediction mode of the second block. However, it will be easily understood by one of ordinary skill in the art that the predictor 105 may determine a prediction mode of the at least one second block as a predetermined prediction mode without obtaining information about a prediction mode of the second block from a bitstream.

The predictor 105 may determine a prediction mode of the second block with a combination of various embodiments described above. For example, when the height and width of the second block are greater than or equal to M and N (or greater than M and N), respectively, (M and N are integers), the predictor 105 may determine the intra mode as a prediction mode of the second block, and when the height and width of the second block are smaller than or equal to A and B (or smaller than A and B), respectively, (A and B are integers), the predictor 105 may determine the inter mode as a prediction mode of the second block. For example, when the height and width of the second block are greater than 64, the predictor 105 may determine the inter mode as a prediction mode of the second block, and when the height and width of the second block are smaller than or equal to 4, the predictor 105 may determine the intra mode as a prediction mode of the second block.

When a slice including the at least one second block is an intra slice, the predictor 105 may determine that the at least one second block is split on the basis of at least one of a size and shape of the at least one second block.

When a slice including the at least one second block is an intra slice and a size of the at least one second block is larger than or equal to a predetermined size (or larger than the predetermined size), the predictor 105 may determine that the at least one second block is split.

When a slice including the at least one second block is an intra slice and an area of the at least one second block is greater than or equal to a predetermined value (or greater than the predetermined value), the predictor 105 may determine that the at least one second block is split.

When a slice including the at least one second block is an intra slice and a sum of a width and height of the at least one second block is greater than or equal to a predetermined value (or greater than the predetermined value), the predictor 105 may determine that the at least one second block is split.

When a slice including the at least one second block is an intra slice and at least one of a width and height of the at least one second block is greater than or equal to a predetermined value (or greater than the predetermined value), the predictor 105 may determine that the at least one second block is split.

At this time, the predictor 105 may split the at least one second block on the basis of at least one of a predetermined split type and a predetermined split direction to determine at least one third block. For example, the image decoding apparatus 100 may quad-split the second block without obtaining information about a split shape mode of the second block from a bitstream to determine at least one third block. When a size of the third block is still larger than or equal to the predetermined size (or larger than the predetermined size), the image decoding apparatus 100 may quad-split the at least one third block to determine a fourth block. That is, until a size of a current block is smaller than or equal to a predetermined size (or smaller than the predetermined size), the block may be recursively split on the basis of at least one of a predetermined split type and a predetermined split direction.

The above description relates to a case in which the predetermined split type is quad-split. However, the predetermined split type may be binary-split and the predetermined split direction may be a horizontal direction and a vertical direction. In this case, it will be easily understood by one of ordinary skill in the art that a block may be split in the same manner. The above description relates to a case in which the predetermined split type is quad-split. However, a predetermined split type or direction may be determined according to a shape of a current block. For example, when a current block is a rectangle having a longer side extending in a horizontal direction, the predictor 105 may determine a split direction as a vertical direction, and binary-split or tri-split as a predetermined split type. Alternatively, when a current block is a rectangle having a longer side extending in a vertical direction, the predictor 105 may determine a split direction as a horizontal direction, and binary-split or tri-split as a predetermined split type.

Up to this point, a case in which, when a slice including at least one second block is an intra slice and a size of the at least one second block is larger than or equal to a predetermined size (or larger than the predetermined size), the image decoding apparatus 100 may split the at least one second block on the basis of at least one of a predetermined split type and a predetermined split direction to determine at least one third block has been described in detail. However, it will be easily understood by one of ordinary skill in the art that, when a slice including at least one second block is an intra slice and a size of the at least one second block is larger than or equal to a predetermined size (or larger than the predetermined size), the image decoding apparatus 100 may obtain information about a split shape mode of the second block from a bitstream and split the second block on the basis of the split shape mode of the second block to determine at least one third block.

The predictor 105 may obtain a prediction block of a block included in the at least one second block on the basis of a prediction mode and whether to split the at least one second block. The predictor 105 may determine a prediction mode of the at least one second block on the basis of at least one of a size and shape of the at least one second block, and predict the second block on the basis of the prediction mode of the second block to obtain a prediction block of the second block.

When the predictor 105 determines that the at least one second block is split on the basis of at least one of the size and shape of the at least one second block, the predictor 105 may split the second block to determine at least one third block, and perform prediction on the basis of a prediction mode for the at least one third block to obtain a prediction block of the at least one third block.

The image decoding apparatus 100 may determine at least one of a smallest block and a largest block on the basis of at least one of a resolution of an image and a level of a codec.

As a level value of a codec increases, a size of an image may increase. Also, because a resolution of an image corresponds to a size of the image, a size of an image may increase as a resolution of the image increases.

When an image has a large size, a large size of a smallest block may have no great influence on encoding/decoding performance. Accordingly, by determining a size of a smallest block depending on a size of an image, an external memory bandwidth problem that may occur when encoding/decoding is performed by using a small-sized block such as a block of a 4×4 size may be reduced. Also, an excessive throughput that is generated during a process of parsing a small-sized block may be prevented.

That is, when an image encoding apparatus transmits information about a size of a smallest block and an image decoding apparatus parses the information about the size of the smallest block to determine a size of a smallest block, the image encoding/decoding apparatus may be implemented in consideration of all possible sizes of a smallest block. However, when a size of a smallest block is determined on the basis of at least one of a level of a codec and a resolution of an image, an image encoding/decoding apparatus may be implemented to determine a size of a smallest block in consideration of only at least one of the level of the codec and the resolution of the image, resulting in higher efficiency in view of implementations.

For example, the image decoding apparatus 100 may determine a size of a smallest block on the basis of a level of a codec, as shown in Table 1 below.

TABLE 1

| Level | Size (Width or Height) of Smallest Block |
|---|---|
| 1 | 4 |
| 2 | 4 |
| 3 | 4 |
| 4 | 8 |
| 5 | 8 |

For example, the image decoding apparatus 100 may determine a smallest block area on the basis of a level of a codec, as shown in Table 2 below. A size of a block that can be used for decoding may be determined on the basis of the smallest block area.

TABLE 2

| Level | Smallest Block Area (Height * Width) |
|---|---|
| 1 | 16 |
| 2 | 16 |
| 3 | 16 |
| 4 | 32 |
| 5 | 32 |
| 6 | 64 |
| 7 | 64 |

Also, for example, the image decoding apparatus 100 may determine a size of a smallest block on the basis of a resolution of an image. For example, the image decoding apparatus 100 may determine a size of a smallest block according to a resolution of a predetermined image. When a resolution of a predetermined image is 3840×2160, the image decoding apparatus 100 may determine a size of a smallest block as one of block sizes of M×N or more (M and N are integers). When an image has a large size, a large size of a smallest block may have no great influence on encoding/decoding performance. Accordingly, by determining a size of a smallest block depending on a size of an image, an external memory bandwidth problem that may occur when encoding/decoding is performed by using a small-sized block such as a block of a 4×4 size may be reduced. Also, an excessive throughput that is generated during a process of parsing a small-sized block may be prevented. Also, when a level value of a codec is smaller than or equal to a predetermined value, the image decoding apparatus 100 may determine a size of a largest block as a predetermined size (for example, 64×64). Also, when a resolution of an image is lower than a predetermined resolution, the image decoding apparatus 100 may determine a size of a largest block as a predetermined size (for example, 64×64).

When 4×4, 4×8 and 8×4 blocks are allowed for decoding of a luma component, the image decoding apparatus 100 may determine 2×2, 2×8 and 4×2 as sizes of allowed blocks of a chroma component corresponding to the allowed blocks of the luma component. When the image decoding apparatus 100 receives and parses residual information (residual information about a transform coefficient of a block) for a block of a 2×N size (N is an integer) or a N×2 size (N is an integer), an excessive throughput may be generated. Accordingly, when a current block is a block of a 2×N or N×2 size, the image decoding apparatus 100 may obtain no residual information from a bitstream. For example, the image decoding apparatus 100 may determine a mode of a current block as a skip mode without obtaining a flag for the skip mode. When the image decoding apparatus 100 determines a mode of the current block as a skip mode, the image decoding apparatus 100 may obtain no residual information from a bitstream and also may not perform decoding.

Also, when a current block is 2×N or N×2 and a mode of the current block is an inter mode, the image decoding apparatus 100 may determine a value of coded block pattern information, a coded block flag (cbf_cb and cbf_cr) or a value of root_cbf for a component of 2×N or N×2, as 0. Herein, the coded block pattern information, the coded block flag (cbf_cb and cbf_cr) information or the root_cbf may be information representing whether all values of transform coefficients included in the block are 0.

When the image decoding apparatus 100 determines the values of the information as 0, the image decoding apparatus 100 may obtain no residual information for the current block from a bitstream and may not perform decoding.

When a current block is 2×N or N×2 and a mode of the current block is an intra mode, the image decoding apparatus 100 may determine a value of coded block pattern information for a component of 2×N or N×2, as 0. When the image decoding apparatus 100 determines the value of the information as 0, the image decoding apparatus 100 may obtain no residual information for the current block from a bitstream and may not perform decoding.

The image decoder 110 may reconstruct a block included in the at least one second block on the basis of the prediction block of the block included in the at least one second block. The image decoding apparatus 100 may obtain information about a residual of a block included in the second block from a bitstream, and perform inverse-quantization/inverse-transformation on the basis of the information about the residual to obtain a residual block of the block included in the second block. Then, the image decoder 110 may reconstruct the block included in the at least one second block on the basis of the residual block and the prediction block of the block included in the at least one second block. That is, the image decoder 110 may find a sum of a sample value for the prediction block of the block included in the at least one second block and a sample value of the residual block to determine a sample value of a reconstructed block.

Figure 1B:
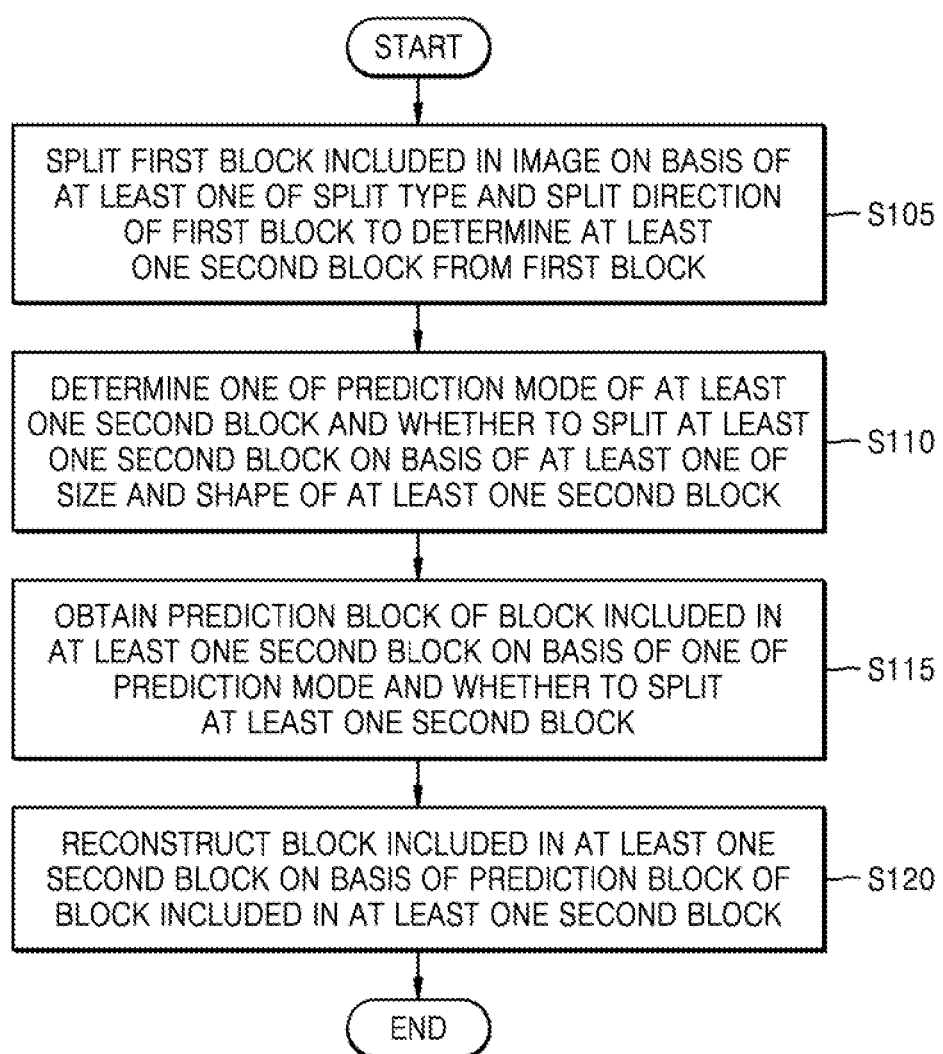
FIG. 1B is a flowchart of an image decoding method according to various embodiments.

FIG. 1B is a flowchart of an image decoding method according to various embodiments.

In operation S105, the image decoding apparatus 100 may split a first block included in an image on the basis of at least one of a split type and a split direction of the first block to determine at least one second block from the first block. The image decoding apparatus 100 may obtain information about a split shape mode of the first block from a bitstream, and when the information about the split shape mode represents that the first block is split, the image decoding apparatus 100 may split the first block on the basis of at least one of a split type and a split direction included in the information about the split shape mode to determine at least one second block from the first block.

In operation S110, the image decoding apparatus 100 may determine one of a prediction mode of the at least one second block and whether to split the at least one second block, on the basis of at least one of a size and shape of the at least one second block. The image decoding apparatus 100 may determine the intra mode or the inter mode as a prediction mode of the at least one second block, on the basis of at least one of the size and shape of the at least one second block. Alternatively, the image decoding apparatus 100 may determine that the second block is split, based on at least one of the size and shape of the at least one second block. When the image decoding apparatus 100 determines that the second block is split, the image decoding apparatus 100 may split the second block on the basis of at least one of a predetermined split type and a predetermined split direction of the second block to determine at least one third block.

In operation S115, the image decoding apparatus 100 may obtain a prediction block of a block included in the at least one second block, on the basis of one of the prediction mode and whether to split the at least one second block. The image decoding apparatus 100 may predict the second block on the basis of the determined prediction mode to obtain a prediction block of the second block. Alternatively, when the image decoding apparatus 100 determines that the at least one second block is split, the image decoding apparatus 100 may split the second block on the basis of at least one of a predetermined split type and a predetermined split direction to determine at least one third block, and predict the at least one third block on the basis of the prediction mode to obtain a prediction block of the at least one third block.

In operation S120, the image decoding apparatus 100 may reconstruct the block included in the second block on the basis of the prediction block of the block included in the second block. The image decoding apparatus 100 may obtain information about a residual of the block included in the second block from a bitstream, perform inverse-quantization/inverse-transformation based on the information about the residual to obtain a residual block of the block included in the second block. Then, the image decoder 110 may reconstruct the block included in the at least one second block on the basis of the residual block and the prediction block of the block included in the at least one second block. That is, the image decoder 110 may add a sample value for the prediction block of the block included in the at least one second block and a sample value for the residual block to determine a sample value of a reconstructed block.

Figure 1C:
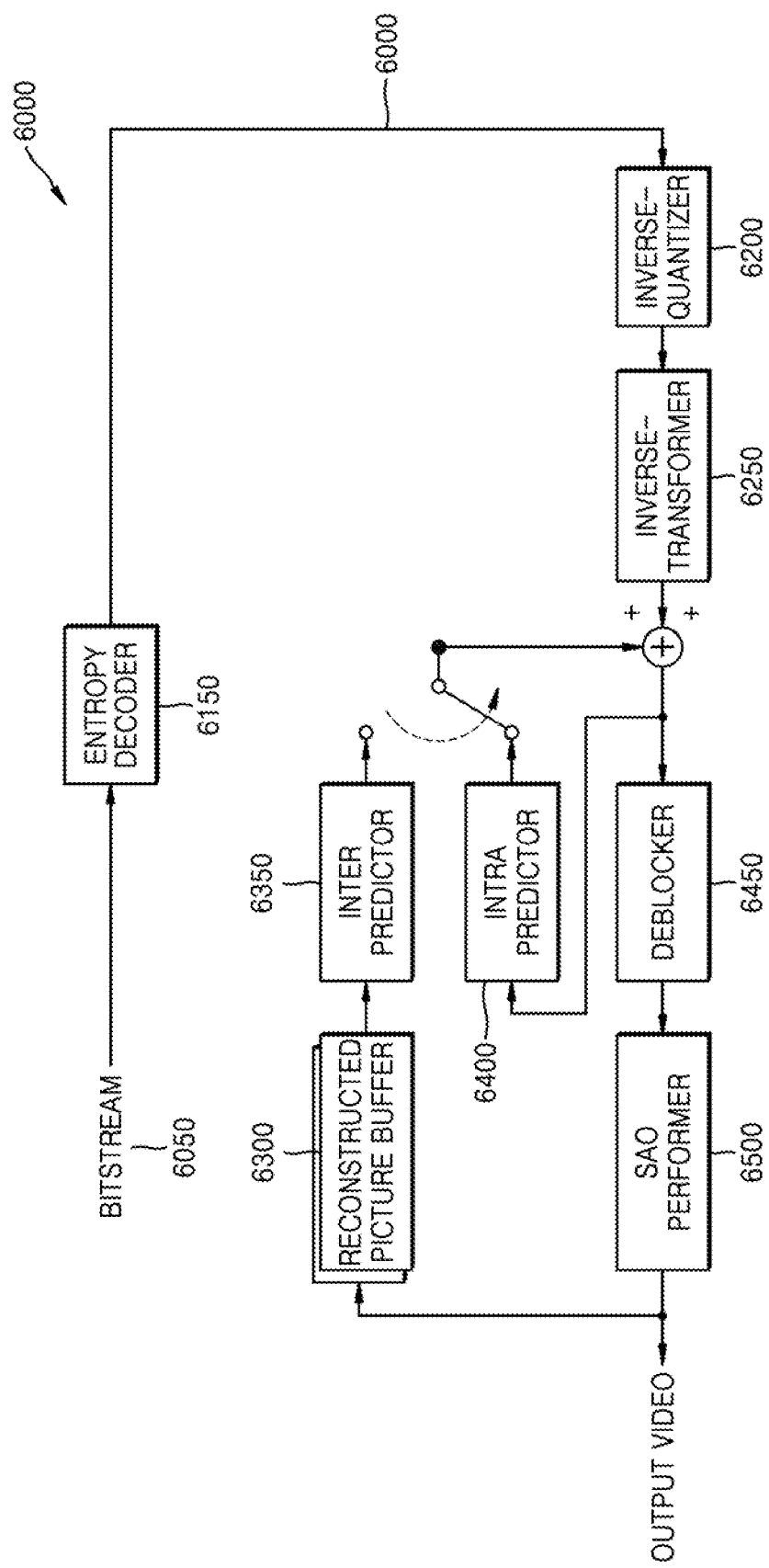
FIG. 1C is a block diagram of an image decoder according to various embodiments.

FIG. 1C is a block diagram of an image decoder 6000 according to various embodiments.

The image decoder 6000 according to various embodiments may perform tasks that are performed by the predictor 105 and the image decoder 110 of the image decoding apparatus 100 to encode image data.

Referring to FIG. 1C, an entropy decoder 6150 may parse encoded image data that is to be decoded and encoding information required for decoding, from a bitstream 6050. The encoded image data may be a quantized transform coefficient, and an inverse-quantizer 6200 and an inverse-transformer 6250 may reconstruct residue data from the quantized transform coefficient.

An intra predictor 6400 may perform intra prediction for each block. An inter predictor 6350 may perform inter prediction using a reference image obtained from a reconstructed picture buffer 6300 for each block. Prediction data for each block generated by the intra predictor 6400 or the inter predictor 6350 may be added to the residue data so that data of a spatial area for a block of a current image may be reconstructed. A de-blocker 6450 and a SAO performer 6500 may perform loop filtering on the reconstructed data of the spatial area to output a filtered, reconstructed image 6600. Also, reconstructed images stored in the reconstructed picture buffer 6300 may be output as reference images. The intra predictor 6400 and the inter predictor 6350 of FIG. 1C may be included in the predictor 105 of FIG. 1A.

For the image decoder 110 of the image decoding apparatus 100 to decode image data, phased tasks of the image decoder 6000 according to various embodiments may be performed for each block.

Figure 2A:
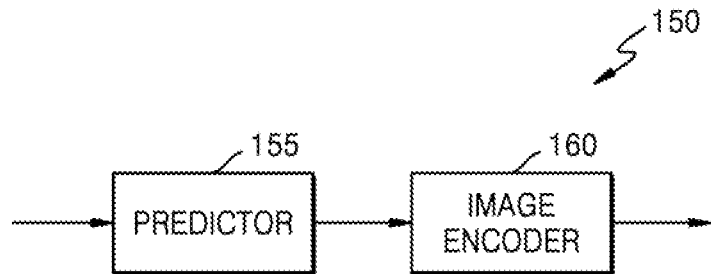
FIG. 2A is a block diagram of an image encoding apparatus according to various embodiments.

FIG. 2A is a block diagram of an image encoding apparatus according to various embodiments.

An image encoding apparatus 150 according to various embodiments may include a predictor 155 and an image encoder 160.

The predictor 155 and the image encoder 160 may include at least one processor. Also, the predictor 155 and the image encoder 160 may include a memory storing instructions that are to be executed by the at least one processor. The image encoder 160 may be implemented as separate hardware from the predictor 155, or include the predictor 155.

The predictor 155 may split a first block included in an image on the basis of at least one of a split type and a split direction for the first block to determine at least one second block from the first block. The predictor 155 may perform encoding on the first block on the basis of at least one of various split types and split directions for the first block, determine at least one of a split type and a split direction for the first block on the basis of an encoding rate and distortion cost, and split the first block on the basis of the at least one of the split type and the split direction for the first block to determine at least one second block from the first block.

The predictor 155 may determine one of a prediction mode of the at least one second block and whether to split the at least one second block on the basis of at least one of a size and shape of the at least one second block. When a prediction mode of the second block is determined on the basis of at least one of the size and shape of the second block, the second block may be a block that is no longer split. Meanwhile, when whether to split the second block is determined on the basis of at least one of the size and shape of the second block, the second block may be further split.

When the size of the at least one second block is smaller than or equal to a predetermined size (or smaller than the predetermined size), the predictor 155 may determine the intra mode as a prediction mode of the at least one second block. In this case, the predetermined size may be M×N (M and N are integers). M and N may be multiples of 4. For example, when the size of the at least one second block is smaller than or equal to 4×4 which is a predetermined size (or smaller than 4×4), the predictor 155 may determine the intra mode as a prediction mode of the second block.

When the size of the at least one second block is larger than or equal to the predetermined size (or larger than the predetermined size), the predictor 155 may determine the inter mode as a prediction mode of the at least one second block. In this case, the predetermined size may be M×N (M and N are integers). M and N may be multiples of 4. For example, when the size of the at least one second block is smaller than or equal to 64×64 which is a predetermined size, the predictor 155 may determine the inter mode as a prediction mode of the second block.

When an area of the at least one second block is smaller than or equal to a predetermined value (or smaller than the predetermined value), the predictor 155 may determine the intra mode as a prediction mode of the second block. The area of the second block may be a product of a height and width of the second block. For example, when the area of the second block is smaller than or equal to K (K is an integer) (or smaller than K), the predictor 155 may determine the intra mode as a prediction mode of the at least one second block. For example, when the area of the second block is smaller than or equal to 16 (or smaller than 16), the predictor 155 may determine the intra mode as a prediction mode of the second block. In this case, the size of the second block may be smaller than or equal to 4×4. Alternatively, the size of the second block may be one of 8×2, 2×8, 1×16, and 16×1.

When the area of the at least one second block is greater than or equal to the predetermined value (or greater than the predetermined value), the predictor 155 may determine the inter mode as a prediction mode of the at least one second block. For example, when the area of the second block is greater than or equal to K (or larger than K), the predictor 155 may determine the inter mode as a prediction mode of the second block. For example, when the area of the second block is greater than or equal to 4096, the predictor 155 may determine the inter mode as a prediction mode of the second block. In this case, the size of the second block may be larger than or equal to 64×64. Alternatively, the size of the second block may be one of 128×32, 32×128, 16×256, and 256×16.

When a sum of a height and width of the second block is smaller than or equal to a predetermined value (or smaller than the predetermined value), the predictor 155 may determine the intra mode as a prediction mode of the second block. For example, when the sum of the height and width of the second block is smaller than or equal to K (K is an integer) (or smaller than K), the predictor 155 may determine the intra mode as a prediction mode of the second block.

For example, when the height and width of the second block is smaller than or equal to the predetermined value (or smaller than the predetermined value), the predictor 155 may determine the intra mode as a prediction mode of the second block. For example, when the sum of the height and width of the second block is smaller than or equal to K (K is an integer) (or smaller than K), the predictor 155 may determine the intra mode as a prediction mode of the second block. For example, when the sum the height and width of the second block is smaller than or equal to 8 (or smaller than 8), the predictor 155 may determine the intra mode as a prediction mode of the second block.

When the height and width of the second block is greater than or equal to a predetermined value (or greater than the predetermined value), the predictor 155 may determine the inter mode as a prediction mode of the second block. For example, when the sum of the height and width of the second block is greater than or equal to K (K is an integer) (or greater than K), the predictor 155 may determine the inter mode as a prediction mode of the second block. For example, when the sum of the height and width of the second block is greater than or equal to 128 (or greater than 128), the predictor 155 may determine the inter mode as a prediction mode of the second block.

When at least one of the height and width of the at least one second block is smaller than or equal to a predetermined value (or smaller than the predetermined value), the predictor 155 may determine the intra mode as a prediction mode of the second block. For example, when at least one of the height and width of the second block is smaller than or equal to a predetermined value K (K is an integer) (or smaller than the predetermined value K), the predictor 155 may determine the intra mode as a prediction mode of the second block. Herein, K may be a multiple of 4. For example, when each of the height and width of the second block is smaller than or equal to 4, the predictor 155 may determine the intra mode as a prediction mode of the second block.

When at least one of the height and width of the at least one second block is greater than or equal to a predetermined value (or greater than the predetermined value), the predictor 155 may determine the inter mode as a prediction mode of the second block. For example, when at least one of the height and width of the second block is greater than or equal to a predetermined value K (K is an integer) (or greater than the predetermined value K), the predictor 155 may determine the inter mode as a prediction mode of the second block. Herein, K may be a multiple of 4. For example, when each of the height and width of the second block is greater than or equal to 64 (or greater than 64), the predictor 155 may determine the inter mode as a prediction mode of the second block.

The predictor 155 may determine the intra mode or the inter mode as a prediction mode of the second block on the basis of a shape of the at least one second block. The predictor 155 may determine a prediction mode of the at least one second block on the basis of at least one of whether the at least one second block is a non-square or a square and a ratio of a height and width of the at least one second block. For example, when the at least one second block is a non-square (that is, when the second block is not a square), the predictor 155 may determine a prediction mode of the at least one second block as a predetermined prediction mode. For example, the predetermined prediction mode may be one of the intra mode or the inter mode. In this case, the image encoding apparatus 150 may not encode information about the prediction mode of the second block. That is, the image encoding apparatus 150 may not include information about the prediction mode of the second block in a bitstream.

When the at least one second block is a square, the image encoding apparatus 150 may encode the second block on the basis of a plurality of prediction modes, and determine a prediction mode on the basis of a rate and distortion cost. The image encoding apparatus 150 may encode information about the prediction mode of the second block on the basis of the prediction mode, and include the encoded information about the prediction mode of the second block in a bitstream.

However, the predictor 155 may not encode the information about the prediction mode of the second block. It will be easily understood by one of ordinary skill in the art that, when the at least one second block is a non-square, a prediction mode of the at least one second block may be determined as a predetermined prediction mode.

When a ratio of the height and width of the at least one second block is greater than or equal to a predetermined value K1 (or greater than the predetermined value K1) or smaller than or equal to a predetermined value K2 (or smaller than the predetermined value K2), the predictor 155 may determine a predetermined prediction mode as a prediction mode of the second block. For example, when the ratio of the height and width of the at least one second block is greater than 0 and smaller than or equal to 0.5 (or smaller than 0.5), the predictor 155 may determine a predetermined prediction mode as a prediction mode of the second block. When the ratio of the height and width of the at least one second block is greater than or equal to 2 (or greater than 2), the predictor 155 may determine a predetermined prediction mode as a prediction mode of the second block.

When the ratio of the height and width of the at least one second block is greater than or equal to 0.5 (or greater than 0.5) and smaller than or equal to 2 (or smaller than 2), the image encoding apparatus 150 may encode the second block on the basis of a plurality of prediction modes, and determine a prediction mode on the basis of a rate and distortion cost. The image encoding apparatus 150 may encode information about the prediction mode of the second block on the basis of the prediction mode, and include the encoded information about the prediction mode of the second block in a bitstream. However, it will be easily understood by one of ordinary skill in the art that the image encoding apparatus 150 may not encode the information about the prediction mode of the second block, and may determine a predetermined prediction mode as a prediction mode of the at least one second block.

The predictor 155 may determine a prediction mode of the second block with a combination of various embodiments described above. For example, when the height and width of the second block are respectively greater than or equal to M and N (M and N are integers) (or greater than M and N), the predictor 155 may determine the intra mode as a prediction mode of the second block, and when the height and width of the second block are respectively smaller than or equal to A and B (A and B are integers) (or smaller than A and B), the predictor 155 may determine the inter mode as a prediction mode of the second block. For example, when the height and width of the second block are greater than 64, the predictor 155 may determine the inter mode as a prediction mode of the second block, and when the height and width of the second block are smaller than or equal to 4, the predictor 155 may determine the intra mode as a prediction mode of the second block.

When a slice including the at least one second block is an intra slice and a size of the at least one second block is larger than or equal to a predetermined size (or larger than the predetermined size), the predictor 155 may determine that the at least one second block is split. In this case, the predictor 155 may split the at least one second block on the basis of at least one of a predetermined split type and a predetermined split direction to determine at least one third block. For example, the predictor 155 may quad-split the second block to determine at least one third block. When a size of the third block is still larger than or equal to the predetermined size (or larger than the predetermined size), the predictor 155 may again quad-split the at least one third block to determine a fourth block. That is, the predictor 155 may recursively split a current block on the basis of at least one of a predetermined split type and a predetermined split direction until a size of the current block is smaller than or equal to a predetermined size (or smaller than the predetermined size).

The above description relates to a case in which the predetermined split type is quad-split. However, the predetermined split type may be binary-split and the predetermined split direction may be a horizontal direction and a vertical direction. In this case, it will be easily understood by one of ordinary skill in the art that a block may be split in the same manner The above description relates to a case in which the predetermined split type is quad-split. However, a predetermined split type or direction may be determined according to a shape of a current block. For example, when a current block is a rectangle having a longer side extending in a horizontal direction, the predictor 155 may determine a vertical direction as a split direction, and binary-split or tri-split as a predetermined split type. Alternatively, when a current block is a rectangle having a longer side extending in a vertical direction, the predictor 155 may determine a horizontal direction as a split direction and binary-split or tri-split as a predetermined split type.

Up to this point, a case in which, when a slice including at least one second block is an intra slice and a size of the at least one second block is larger than or equal to a predetermined size (or larger than the predetermined size), the image encoding apparatus 150 may split the at least one second block on the basis of at least one of a predetermined split type and a predetermined split direction to determine at least one third block has been described in detail. However, it will be easily understood by one of ordinary skill in the art that, when a slice including at least one second block is an intra slice and a size of the at least one second block is larger than or equal to a predetermined size (or larger than the predetermined size), the image encoding apparatus 150 may split the second block according to various split shape modes, and determine a split shape mode of the second block from among the various split shape modes on the basis of a rate and distortion cost.

The predictor 155 may obtain a prediction block of a block included in the at least one second block on the basis of a prediction mode and whether to split the at least one second block. The predictor 155 may determine a prediction mode of the at least one second block on the basis of at least one of a size and shape of the at least one second block, and predict the at least one second block on the basis of the prediction mode to obtain a prediction block of the second block.

When the predictor 155 determines that the at least one second block is split on the basis of at least one of a size and shape of the at least one second block, the predictor 155 may split the second block to determine at least one third block, and perform prediction on the basis of a prediction mode of the at least one third block to obtain a prediction block of the at least one third block.

The image encoder 160 may encode the block included in the at least one second block on the basis of the prediction block of the block included in the at least one second block. The image encoder 160 may generate a residual block of the block included in the second block on the basis of a sample value of an original block of the block included in the at least one second block and a sample value of the prediction block of the block included in the at least one second block, and encode information about a sample value of the residual block.

When a block is split and a block to be predicted is determined, the image encoder 160 may encode information about a prediction mode of the block, include the information about the prediction mode of the block in a bitstream, and output the bitstream.

However, when a block is split, a block to be predicted is determined, and a prediction mode of the block is determined on the basis of at least one of a size and shape of the block, the image encoder 160 may encode no information about the prediction mode of the corresponding block.

The image encoder 160 may encode information about a split shape mode of a block, include the encoded information about the split shape mode of the block in a bitstream, and output the bitstream.

When a slice including the second block is an intra slice, the image encoder 160 determines that the second block is split on the basis of at least one of a size and shape of the block, and the image encoder 160 splits the second block on the basis of at least one of a predetermined split type and a predetermined split direction to determine at least one third block, the image encoder 160 may encode information about a split shape mode of the second block, include the information about the split shape mode of the second block in a bitstream, and output the bitstream. In this case, the information about the split shape mode of the second block may represent that the second block is not split. The image decoding apparatus 100 may obtain the information about the split shape mode of the second block from the bitstream to determine the at least one second block. The second block may be a block that is no longer split on the basis of the information about the split shape mode obtained from the bitstream. In this case, the image decoding apparatus 100 may determine that the second block is split on the basis of at least one of a size and shape of the block, and split the second block on the basis of at least one of a predetermined split type and a predetermined split direction to determine at least one third block. Also, the image decoding apparatus 100 may predict the at least one third block according to a prediction mode. Accordingly, when a current slice is an intra slice, the image encoding apparatus 150 may reduce an amount of information about a split shape mode to be explicitly signaled through a bitstream, and the image decoding apparatus 100 may split a block on the basis of the information about the split shape mode, received through the bitstream, and perform prediction on the basis of the split block, like the image encoding apparatus 150.

Figure 2B:
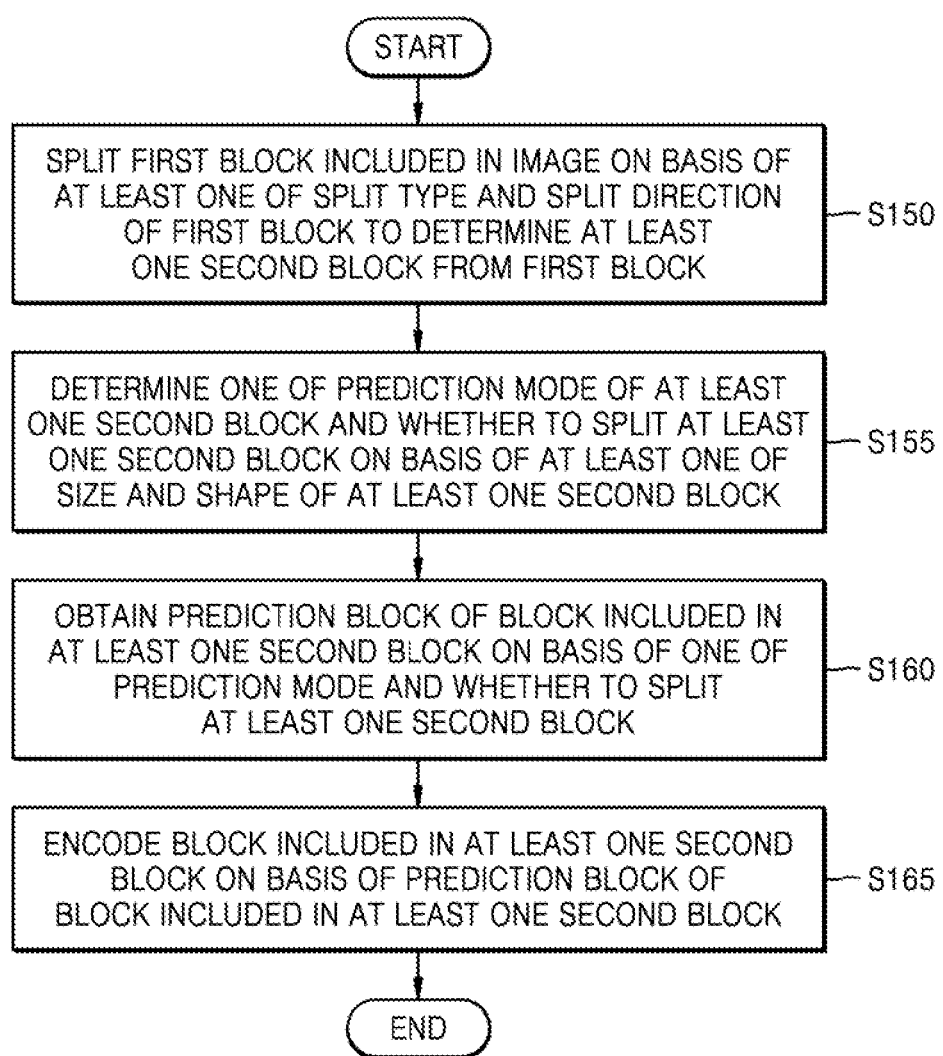
FIG. 2B is a flowchart of an image encoding method according to various embodiments.

FIG. 2B is a flowchart of an image encoding method according to various embodiments.

In operation S150, the image encoding apparatus 150 may split a first block included in an image on the basis of at least one of a split type and a split direction of the first block to determine at least one second block from the first block.

In operation S155, the image encoding apparatus 150 may determine one of a prediction mode of the at least one second block and whether to split the at least one second block on the basis of at least one of a size and shape of the at least one second block.

In operation S160, the image encoding apparatus 150 may obtain a prediction mode of a block included in the at least one second block on the basis of one of the prediction mode of the at least one second block and whether to split the at least one second block.

In operation S165, the image encoding apparatus 150 may encode the block included in the second block on the basis of the prediction block of the block included in the at least one second block. The image encoding apparatus 150 may include information of the encoded block included in the second block in a bitstream, and output the bitstream.

Figure 2C:
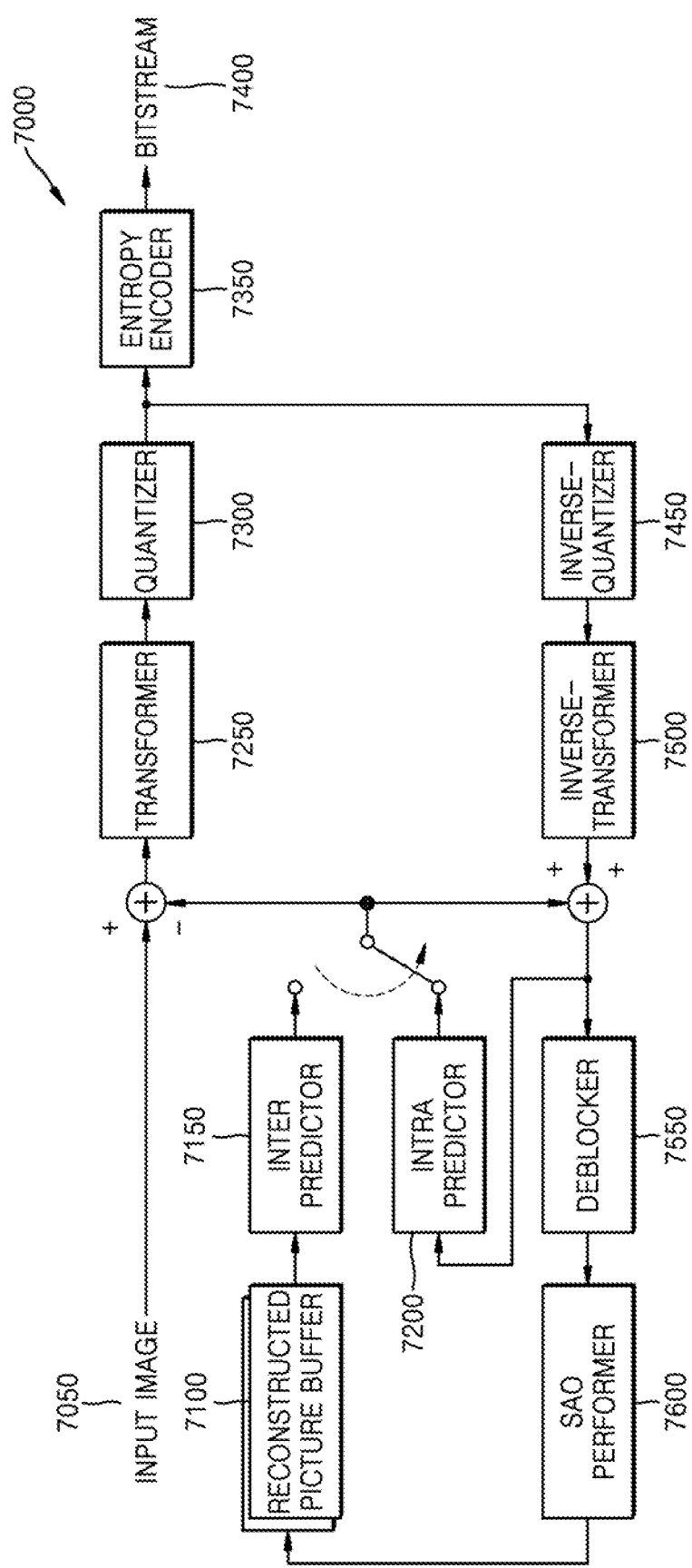
FIG. 2C is a block diagram of an image encoder according to various embodiments.

FIG. 2C is a block diagram of an image encoder according to various embodiments.

An image encoder 7000 according to various embodiments may perform tasks required for encoding image data in the predictor 155 and the image encoder 160 of the image encoding apparatus 150.

That is, an intra predictor 7200 may perform intra prediction for each block of a current image 7050, and an inter predictor 7150 may perform inter prediction using the current image 7050 and a reference image obtained from a reconstructed picture buffer 7100 for each block.

Then, prediction data for each block output from the intra predictor 7200 or the inter predictor 7150 may be subtracted from data for a block to be encoded in the current image 7050 to generate residue data. A transformer 7250 and a quantizer 7300 may perform transformation and quantization on the residue data to output a quantized transform coefficient for each block. A inverse-quantizer 7450 and an inverse-transformer 7500 may perform inverse-quantization and inverse-transformation on the quantized transform coefficient to reconstruct residue data of a spatial area. The reconstructed residual data of the spatial area may be added to the prediction data for each block output from the intra predictor 7200 or the inter predictor 7150 to thus be reconstructed as data of a spatial area for the block of the current image 7050. A deblocker 7550 and a SAO performer 7600 may perform in-loop filtering on the reconstructed data of the spatial area to generate a filtered, reconstructed image. The generated, reconstructed image may be stored in the reconstructed picture buffer 7100. Reconstructed images stored in the reconstructed picture buffer 7100 may be used as reference images for inter prediction of other images. An entropy encoder 7350 may perform entropy encoding on the quantized transform coefficient, and output an entropy encoded coefficient as a bitstream 7400. The intra predictor 7200 and the inter predictor 7150 of FIG. 2C may be included in the predictor 155 of FIG. 2A.

For the image encoder 7000 according to various embodiments to be applied to the image encoding apparatus 150, phased tasks of the image encoder 7000 according to various embodiments may be performed for each block.

FIGS. 3A to 3F are views for describing a process, performed by an image decoding apparatus 100, of splitting a block on the basis of a split shape mode and determining a prediction mode of the block on the basis of a size of the block without obtaining information about a prediction mode from a bitstream, according to an embodiment.

Figure 3A:
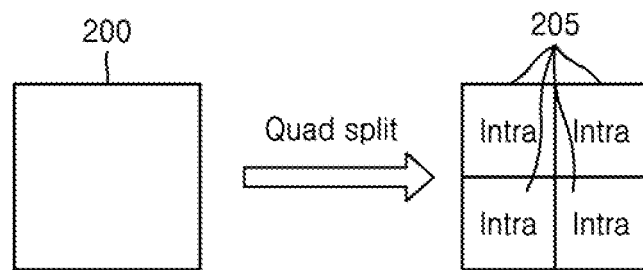
FIGS. 3A to 3F are views for describing a process, performed by an image decoding apparatus 100, of splitting a block on the basis of a split shape mode and determining a prediction mode of the block on the basis of a size of the block without obtaining information about a prediction mode from a bitstream, according to an embodiment.

Referring to FIG. 3A, the image decoding apparatus 100 may determine a split shape mode of a first block 200 on the basis of information about a split shape mode of the first block 200. In this case, a size of the first block 200 may be 8×8. The image decoding apparatus 100 may obtain information about a split shape mode of the first block 200 from a bitstream. In this case, the information about the split shape mode of the first block 200 may represent that the first block 200 is split, and information about a split type of the first block among the information about the split shape mode may represent that a split type of the first block is quad-split. Information about a split direction of the first block 200 among the information about the split shape mode may not exist or may represent a horizontal direction and a vertical direction.

The image decoding apparatus 100 may split the first block 200 into four second blocks 205 on the basis of the split shape mode of the first block 200. In this case, a size of each second block 205 may be 4×4. When the size of each second block 205 is 4×4, the image decoding apparatus 100 may determine the intra mode as a prediction mode of the second blocks 205 without obtaining information about a prediction mode of the second blocks 205 from the bitstream.

Figure 3B:
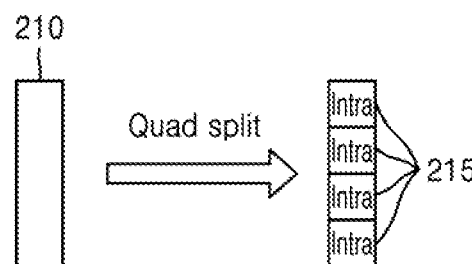

Referring to FIG. 3B, the image decoding apparatus 100 may determine a split shape mode of a first block 210 on the basis of information about the split shape mode of the first block 210. In this case, a size of the first block 210 may be 4×16. The image decoding apparatus 100 may obtain information about a split shape mode of the first block 210 from a bitstream. In this case, the information about the split shape mode of the first block 210 may represent that the first block 210 is split, and information about a split type of the first block among the information about the split shape mode may represent that a split type of the first block 210 is quad-split. Information about a split direction of the first block among the information about the split type mode may represent a horizontal direction.

The image decoding apparatus 100 may split the first block 210 into four second blocks 215 on the basis of the split shape mode of the first block 210. In this case, a size of each second block 215 may be 4×4. When the size of each second block 215 is 4×4, the image decoding apparatus 100 may determine the intra mode as a prediction mode of the second blocks 215 without obtaining information about a prediction mode of the second blocks 215 from a bitstream.

Figure 3C:
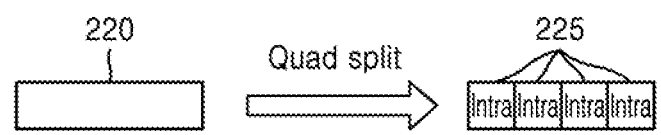

Referring to FIG. 3C, the image decoding apparatus 100 may determine a split shape mode of a first block 220 on the basis of information about the split shape mode of the first block 220. In this case, a size of the first block 220 may be 16×4. The image decoding apparatus 100 may obtain information about a split shape mode of the first block 220 from a bitstream. In this case, the information about the split shape mode of the first block 220 may represent that the first block 220 is split, and information about a split type of the first block 220 among the information about the split shape mode may represent that a split type of the first block 220 is quad-split. Information about a split direction of the first block 220 among the information about the split shape mode may represent a horizontal direction.

The image decoding apparatus 100 may split the first block 220 into four second blocks 225 on the basis of the split shape mode of the first block 220. At this time, a size of each second block 225 may be 4×4. When the size of each second block 225 is 4×4, the image decoding apparatus 100 may determine the intra mode as a prediction mode of the second blocks 225 without obtaining information about a prediction mode of the second blocks 225 from a bitstream.

Figure 3D:
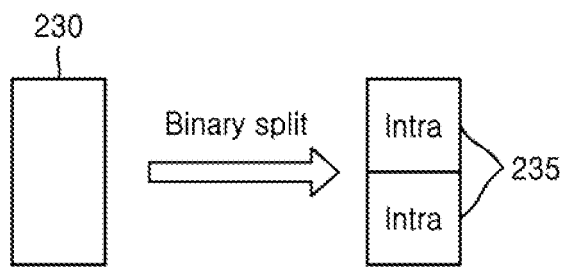

Referring to FIG. 3D, the image decoding apparatus 100 may determine a split shape mode of a first block 230 on the basis of information about the split shape mode of the first block 230. In this case, a size of the first block 230 may be 4×8. The image decoding apparatus 100 may obtain information about a split shape mode of the first block 230 from a bitstream. In this case, the information about the split shape mode of the first block 230 may represent that the first block 230 is split, and information about a split type of the first block 230 among the information about the split shape mode may represent that a split type of the first block 230 is binary-split. Information about a split direction among the information about the split shape mode may represent a horizontal direction.

The image decoding apparatus 100 may split the first block 230 into two second blocks 235 on the basis of the split shape mode of the first block 230. In this case, a size of each second block 235 may be 4×4. When the size of each second block 235 is 4×4, the image decoding apparatus 100 may determine the intra mode as a prediction mode of the second blocks 235 without obtaining information about a prediction mode of the second blocks 235 from a bitstream.

Figure 3E:
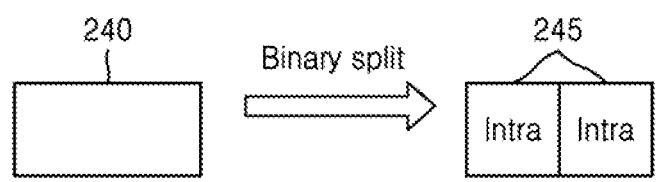

Referring to FIG. 3E, the image decoding apparatus 100 may determine a split shape mode of a first block 240 on the basis of information about the split shape mode of the first block 240. In this case, a size of the first block 240 may be 8×4. The image decoding apparatus 100 may obtain information about a split shape mode of the first block 240 from a bitstream. In this case, the information about the split shape mode of the first block 240 may represent that the first block 240 is split, and information about a split type of the first block 240 among the information about the split shape mode may represent that a split type of the first block 240 is quad-split. Information about a split direction among the information about the split shape mode may represent a vertical direction.

The image decoding apparatus 100 may split the first block 240 into two second blocks 245 on the basis of the split shape mode of the first block 240. In this case, a size of each second block 245 may be 4×4. When a size of each second block 245 is 4×4, the image decoding apparatus 100 may determine the intra mode as a prediction mode of the second blocks 245 without obtaining information about a prediction mode of the second blocks 245 from a bitstream.

Figure 3F:
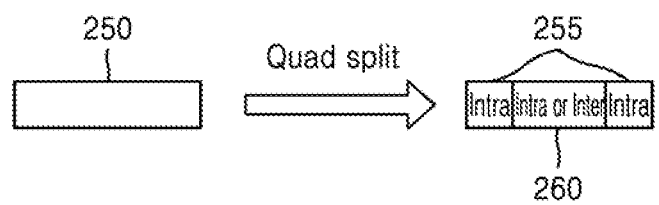

Referring to FIG. 3F, the image decoding apparatus 100 may determine a split shape mode of a first block 250 on the basis of information about the split shape mode of the first block 250. In this case, a size of the first block 250 may be 16×4. The image decoding apparatus 100 may obtain information about a split shape mode of the first block 250 from a bitstream. In this case, the information about the split shape mode of the first block 250 may represent that the first block 250 is split, and information about a split type of the first block among the information about the split shape mode may represent that a split type of the first block 250 is tri-split. Information about a split direction among the information about the split shape mode may represent a vertical direction.

The image decoding apparatus 100 may split the first block 250 into two second blocks 255 and a third block 260 on the basis of the split shape mode of the first block 250. In this case, a size of each second block 255 may be 4×4, and a size of the third block 260 may be 8×4. When the size of each second block 255 is 4×4, the image decoding apparatus 100 may determine the intra mode as a prediction mode of the second blocks 255 without obtaining information about a prediction mode of the second blocks 255 from a bitstream. When the size of the third block 260 is larger than 4×4, the image decoding apparatus 100 may obtain information about a prediction mode of the third block 260 from a bitstream, and determine the intra mode or the inter mode as a prediction mode of the third block 260 on the basis of the information about the prediction mode of the third block 260.

That is, the image decoding apparatus 100 may determine a prediction mode of a block on the basis of a size of the block, thereby reducing an amount of prediction mode information to be explicitly signaled through a bitstream and reducing the complexity of the image decoding apparatus 100, while maintaining decoding performance.

Up to this point, a case in which, when a size of a block is 4×4, the image decoding apparatus 100 determines the intra mode as a prediction mode of the corresponding block has been described in detail with reference to FIGS. 3A to 3F. However, it will be easily understood by one of ordinary skill in the art that prediction modes of blocks may be determined on the basis of various sizes of the blocks.

FIG. 4 shows a pseudo code for the image decoding apparatus 100 to determine a prediction mode of a current block on the basis of a size of the current block, according to an embodiment.

Referring to FIG. 4, when a size of a current block is not 4×4 or a type of a current slice is an inter slice (if(current slice type is Inter slice && block size !=4×4)), the image decoding apparatus 100 may obtain a syntax element skip_flag representing whether a current block is decoded according to a skip mode, from a bitstream. When the syntax element skip_flag is 0, the image decoding apparatus 100 may not decode the current block according to the skip mode. That is, when a mode of a current block is the inter mode, the image decoding apparatus 100 may induce motion information of the current block by using information about surrounding blocks (for example, by using an index representing one motion information among motion information of temporally/spatially surrounding blocks) and perform inter prediction on the current block to obtain a prediction block of the current block. Also, the image decoding apparatus 100 may obtain information about a residual of the current block from a bitstream to perform decoding of the current block. Alternatively, when the mode of the current block is an intra mode, the image decoding apparatus 100 may perform intra prediction to obtain a prediction block of the current block. Also, the image decoding apparatus 100 may obtain information about a residual of the current block from a decoding bitstream to perform decoding of the current block.

When the syntax element information skip_flag is 1, the image decoding apparatus 100 may decode the current block according to the skip mode. The image decoding apparatus 100 may induce motion information of the current block by using information about surrounding blocks (for example, by using a merge index representing one motion information among motion information of surrounding blocks) and perform inter prediction on the current block to obtain a prediction block of the current block However, the image decoding apparatus 100 may perform decoding of the current block without obtaining information about a residual of the current block from a bitstream.

In the other case (that is, when a size of a current block is 4×4 or a type of a current slice is an intra slice), the image decoding apparatus 100 may determine a value of skip_flag as NO_SKIP (that is, 0) without obtaining a syntax element skip_flag representing whether the current block is decoded according to a skip mode from a bitstream.

When the size of the current block is not 4×4 or a type of a current slice including the current block is an inter slice (if(current slice type is Inter slice && block size !=4×4)), the image decoding apparatus 100 may obtain syntax element information pred_mode_flag representing a prediction mode of the current block from a bitstream. When a value of the syntax element information pred_mode_flag is 0, it may represent that a prediction mode of the current block is the inter mode, and when the value of the syntax element information pred_mode_flag is 1, it may represent that the prediction mode of the current block is the intra mode. In the other case (that is, when the size of the current block is 4×4 or the type of the current slice is an intra slice), the image decoding apparatus 100 may determine the intra mode MODE_INTRA as a prediction mode pred_mode_flag of the current block. In this case, a size of a block that is available by the image decoding apparatus 100 may be larger than or equal to 4×4. MODE_INTRA may indicate 1.

Up to this point, a case in which, when a size of a block is 4×4, the image decoding apparatus 100 determines whether a mode of the block is a skip mode and determines the intra mode as a prediction mode of the corresponding block has been described in detail with reference to FIG. 4. However, it will be easily understood by one of ordinary skill in the art that whether a mode of a block is a skip mode may be determined on the basis of various sizes of blocks and the intra mode may be determined as a prediction mode of the corresponding block.

A typical image decoding apparatus has obtained information about a prediction mode of a current block from a bitstream regardless of a size of the current block, and determined a prediction mode of the current block on the basis of the information about the prediction mode of the current block. However, according to an embodiment of the present disclosure, the image decoding apparatus 100 may determine a prediction mode of a current block on the basis of a size of the current block without obtaining information about a prediction mode of the current block from a bitstream, adaptively according to cases, thereby reducing an amount of prediction mode information to be explicitly signaled through a bitstream and reducing the complexity of the image decoding apparatus 100, while maintaining decoding performance.

Also, according to an embodiment of the disclosure, when a current slice is an intra slice, and a size of a current block is larger than or equal to a predetermined size, the image decoding apparatus 100 may further split the current block on the basis of at least one of a predetermined split direction and a predetermined split type without performing intra prediction on the current block, and perform intra prediction on the split block, thereby reducing an amount of split shape mode information to be explicitly signaled through a bitstream and reducing the complexity of the image decoding apparatus 100.

The image encoding apparatus 150 according to various embodiments may reduce an amount of split shape mode information or an amount of prediction mode information to be explicitly signaled through a bitstream, and reduce the complexity of the image encoding apparatus 150.

For example, when an image encoding apparatus inter-predicts a block of a small size according to an inter mode, a greater external memory bandwidth may be required than that required when larger blocks are inter-predicted. In the case of inter-prediction, a fractional pixel value may be used, and to obtain a fractional pixel value, an interpolation filter of a K-tap size may be applied to an integer pixel. When a size of a reference block of an area to which the interpolation filter is applied is M×N (M and N are integers), a pixel value of an area of a size (M+K−1)×(N+K−1) that is larger than the size of the reference block may need to be fetched from a memory. Therefore, when a block of a small size is inter-predicted, a greater external memory bandwidth may be required than that required when larger blocks are inter-predicted. Accordingly, by forcedly setting a prediction mode of a block of a relatively small size to the intra mode instead of the inter mode, a gain may be obtained in view of an external memory bandwidth requirement.

For example, an image encoding/decoding apparatus may perform intra-prediction on a block of a large size. Because a residual value obtained by transforming/inverse-transforming a residual generated based on the intra-prediction is generally greater than a residual value generated by inter-prediction, computational complexity of a transform/inverse-transform task may increase significantly as a size of a transform/inverse-transform matrix increases. Accordingly, by forcedly setting a prediction mode of a block of a relatively large size to the inter mode instead of the intra mode, a gain may be obtained in view of computational complexity.

Hereinafter, splitting a coding unit according to an embodiment of the present disclosure will be described in detail.

An image may be split in a largest coding unit. A size of the largest coding unit may be determined on the basis of information obtained from a bitstream. A shape of the largest coding units may be a square of the same size. However, an embodiment is not limited thereto. Also, the largest coding unit may be hierarchically split into coding units on the basis of information about a split shape mode obtained from a bitstream. The information about the split shape mode may include at least one among information representing whether to split, split direction information, and split type information. The information representing whether to split may represent whether to split the coding unit. The split direction information may represent one of a horizontal direction or a vertical direction in which the coding unit is split. The split type information may represent one of binary-split, tri-split or quad-split by which the coding unit is split.

For convenience of description, the present disclosure describes a case in which the information about the split shape mode is divided into information representing whether to split, split direction information, and split type information, however, the present disclosure is not limited to the case. The image decoding apparatus 100 may obtain the information about the split shape mode as an empty string from a bitstream. The image decoding apparatus 100 may determine whether to split the coding unit, a split direction, and a split type on the basis of the empty string.

The coding unit may be smaller than or equal to the largest coding unit. For example, when the information about the split shape mode represents that the coding unit is not split, the coding unit may have the same size as the largest coding unit. When the information about the split shape mode represents that the coding unit is split, the largest coding unit may be split into coding units of a lower depth. Also, when information about a split shape mode with respect to the coding unit of the lower depth represents split, the coding unit of the lower depth may be split into coding units of a smaller size. However, splitting an image is not limited to this, and a largest coding unit may be not distinguished from a coding unit. Splitting a coding unit will be described in more detail with reference to FIGS. 5 to 18.

Also, a coding unit may be split into prediction units for predicting an image. The prediction unit may be equal to or smaller than the coding unit. Also, a coding unit may be split into transform units for transforming an image. The transform unit may be equal to or smaller than the coding unit. A shape and size of the transform unit may be not associated with those of the prediction unit. The coding unit may be distinguished from the prediction unit and the transform unit, however, the coding unit, the prediction unit, and the transform unit may be the same. Splitting the prediction unit and the transform unit may be performed in the same way as splitting the coding unit. Splitting the coding unit will be described in more detail with reference to FIGS. 5 to 18. A current block and a surrounding block of the present disclosure may represent ones of the largest coding unit, the coding unit, the prediction unit, and the transform unit. Also, a current block or a current coding unit may be a block that is being currently decoded or encoded or a block that is being currently split. The surrounding block may be a block reconstructed before the current block. The surrounding block may be spatially or temporally adjacent to the current block. The surrounding block may be located at one of a left lower side, a left side, a left upper side, a upper side, a right upper side, a right side, and a right lower side of the current block.

Figure 5:
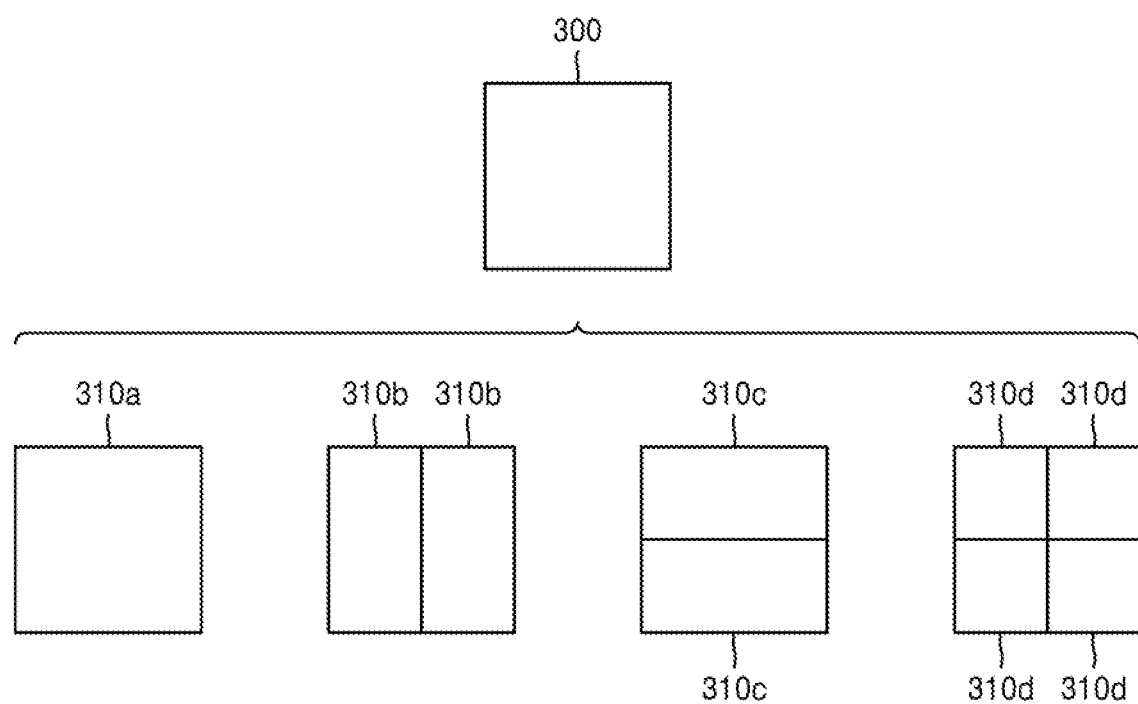
FIG. 5 shows a process, performed by an image decoding apparatus, of determining at least one coding unit by splitting a current coding unit, according to an embodiment.

FIG. 5 shows a process, performed by the image decoding apparatus 100, of determining at least one coding unit by splitting a current coding unit, according to an embodiment.

A block shape may include 4N×4N, 4N×2N, 2N×4N, 4N×N or N×4N, where N may be a positive integer. Block shape information may be information representing at least one of a shape, a direction, a ratio of width and height or a size of a coding unit.

The shape of the coding unit may include a square or a non-square. When a length of the width of the coding unit is equal to a length of the height of the coding unit (that is, when a block shape of the coding unit is 4N×4N), the image decoding apparatus 100 may determine block shape information of the coding unit as a square. The image decoding apparatus 100 may determine the shape of the coding unit as a non-square.

When a length of the width of the coding unit is different from a length of the height of the coding unit (that is, when a block shape of the coding unit is 4N×2N, 2N×4N, 4N×N or N×4N), the image decoding apparatus 100 may determine block shape information of the coding unit as a non-square. When the shape of the coding unit is a non-square, the image decoding apparatus 100 may determine the ratio of the width and height among the block shape information of the coding unit as at least one of 1:2, 2:1, 1:4, 4:1, 1:8 or 8:1. Also, the image decoding apparatus 100 may determine whether the coding unit is split in a horizontal direction or a vertical direction, on the basis of the lengths of the width and height of the coding unit. Also, the image decoding apparatus 100 may determine a size of the coding unit on the basis of at least one of the length of the width of the coding unit, the length of the height of the coding unit, or an area of the coding unit.

According to an embodiment, the image decoding apparatus 100 may determine the shape of the coding unit by using the block shape information, and may determine a splitting method of the coding unit by using the information about the split shape mode. That is, a coding unit splitting method indicated by the information representing the split shape mode may be determined based on a block shape indicated by the block shape information used by the image decoding apparatus 100.

The image decoding apparatus 100 may obtain information about a split shape mode from a bitstream. However, the image decoding apparatus 100 and the image encoding apparatus 150 may obtain information about a predetermined split shape mode on the basis of block shape information. The image decoding apparatus 100 may obtain information about a predetermined split shape mode for a largest coding unit or a smallest coding unit. For example, the image decoding apparatus 100 may determine information about a split shape mode for a largest coding unit as quad-split. Also, the image decoding apparatus 100 may determine information about a split shape mode for a smallest coding unit as "no-split". More specifically, the image decoding apparatus 100 may determine a size of the largest coding unit as 256×256. The image decoding apparatus 100 may determine the information about the predetermined split shape mode as quad-split. The quad-split may be a split shape mode of bisecting both a width and height of a coding unit. The image decoding apparatus 100 may obtain a coding unit of a 128×128 size from the largest coding unit of the 256×256 size on the basis of the information about the split shape mode. Also, the image decoding apparatus 100 may determine a size of the smallest coding unit as 4×4. The image decoding apparatus 100 may obtain information about a split shape mode representing "no-split" for the smallest coding unit.

According to an embodiment, the image decoding apparatus 100 may use the block shape information representing that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the information about the split shape mode. Referring to FIG. 5, when the block shape information of a current coding unit 300 indicates a square shape, the decoder 120 may determine that a coding unit 310a having the same size as the current coding unit 300 is not split, based on the information about the split shape mode indicating not to perform splitting, or may determine coding units 310b, 310c, or 310d split based on the information about the split shape mode indicating a predetermined splitting method.

Referring to FIG. 5, according to an embodiment, the image decoding apparatus 100 may determine two coding units 310b obtained by splitting the current coding unit 300 in a vertical direction, based on the information about the split shape mode indicating to perform splitting in a vertical direction. The image decoding apparatus 100 may determine two coding units 310c obtained by splitting the current coding unit 300 in a horizontal direction, based on the information about the split shape mode indicating to perform splitting in a horizontal direction. The image decoding apparatus 100 may determine four coding units 310*d* obtained by splitting the current coding unit 300 in vertical and horizontal directions, based on the information about the split shape mode indicating to perform splitting in vertical and horizontal directions. However, splitting methods of the square coding unit are not limited to the above-described methods, and the information about the split shape mode may indicate various methods. Predetermined splitting methods of splitting the square coding unit will be described in detail below in relation to various embodiments.

Figure 6:
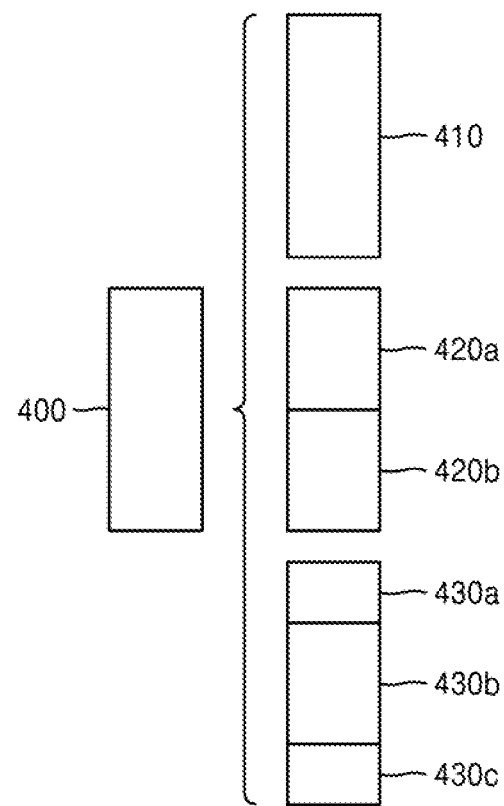
FIG. 6 shows a process, performed by an image decoding apparatus, of determining at least one coding unit by splitting a coding unit of a non-square shape, according to an embodiment.
Figure 6:
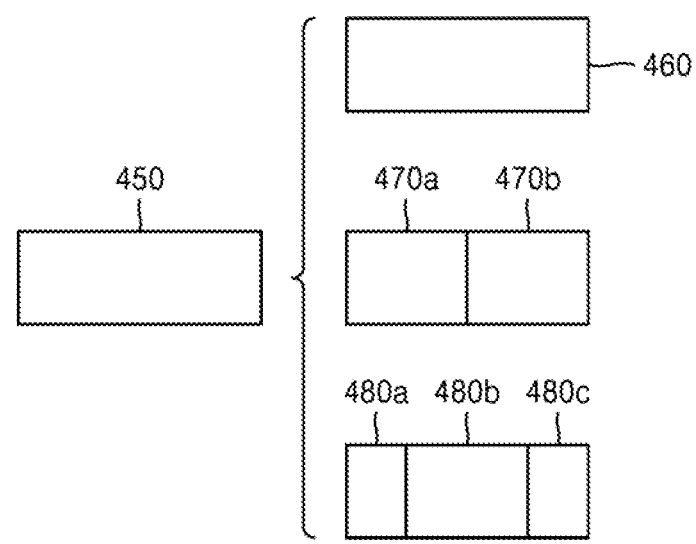

FIG. 6 illustrates a process, performed by the image decoding apparatus 100, of determining at least one coding unit by splitting a non-square coding unit, according to an embodiment.

According to an embodiment, the image decoding apparatus 100 may use block shape information representing that a current coding unit has a non-square shape. The image decoding apparatus 100 may determine whether not to split the non-square current coding unit or whether to split the non-square current coding unit by using a predetermined splitting method, based on information about a split shape mode. Referring to FIG. 6, when the block shape information of a current coding unit 400 or 450 indicates a non-square shape, the image decoding apparatus 100 may determine that a coding unit 410 or 460 having the same size as the current coding unit 400 or 450 is not split, based on the information about the split shape mode indicating not to perform splitting, or determine coding units 420*a* and 420*b*, 430*a* to 430*c*, 470*a* and 470*b*, or 480*a* to 480*c* split based on the information about the split shape mode indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the information about the split shape mode and, in this case, the information about the split shape mode may indicate the number of one or more coding units generated by splitting a coding unit. Referring to FIG. 6, when the information about the split shape mode indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the information about the split shape mode.

According to an embodiment, when the image decoding apparatus 100 splits the non-square current coding unit 400 or 450 based on the information about the split shape mode, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the information about the split shape mode represents that a coding unit is split into an odd number of blocks (tri-split), the image decoding apparatus 100 may determine an odd number of coding units included in the current coding unit 400 or 450. For example, when the information about the split shape mode represents that the current coding unit 400 or 450 is split into three coding units, the image decoding apparatus 100 may split the current coding unit 400 or 450 into three coding units 430*a*, 430*b*, 430*c*, 480*a*, 480*b* and 480*c*.

According to an embodiment, a ratio of a width and height of the current coding unit 400 or 450 may be 4:1 or 1:4. When the ratio of the width and height is 4:1, the block shape information may be a horizontal direction because a length of the width is longer than a length of the height. When the ratio of the width and height is 1:4, the block shape information may be a vertical direction because the length of the width is shorter than the length of the height. The image decoding apparatus 100 may determine that the current coding unit is split into an odd number of blocks, on the basis of the information about the split shape mode. Also, the image decoding apparatus 100 may determine a split direction of the current coding unit 400 or 450 on the basis of the block shape information of the current coding unit 400 or 450. For example, when the current coding unit 400 is in the vertical direction, the image decoding apparatus 100 may split the current coding unit 400 in the horizontal direction to determine coding units 430*a*, 430*b* and 430*c*. Also, when the current coding unit 450 is in the horizontal direction, the image decoding apparatus 100 may split the current coding unit 450 in the vertical direction to determine coding units 480*a*, 480*b* and 480*c*.

According to an embodiment, the image decoding apparatus 100 may determine the odd number of coding units included in the current coding unit 400 or 450, and not all the determined coding units may have the same size. For example, a predetermined coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the information about the split shape mode indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 6, the image decoding apparatus 100 may set a decoding process regarding the coding unit 430*b* or 480*b* located at the center among the three coding units 430*a*, 430*b*, and 430*c* or 480*a*, 480*b*, and 480*c* generated as the current coding unit 400 or 450 is split to be different from that of the other coding units 430*a* and 430*c*, or 480*a* or 480*c*. For example, the image decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 7:
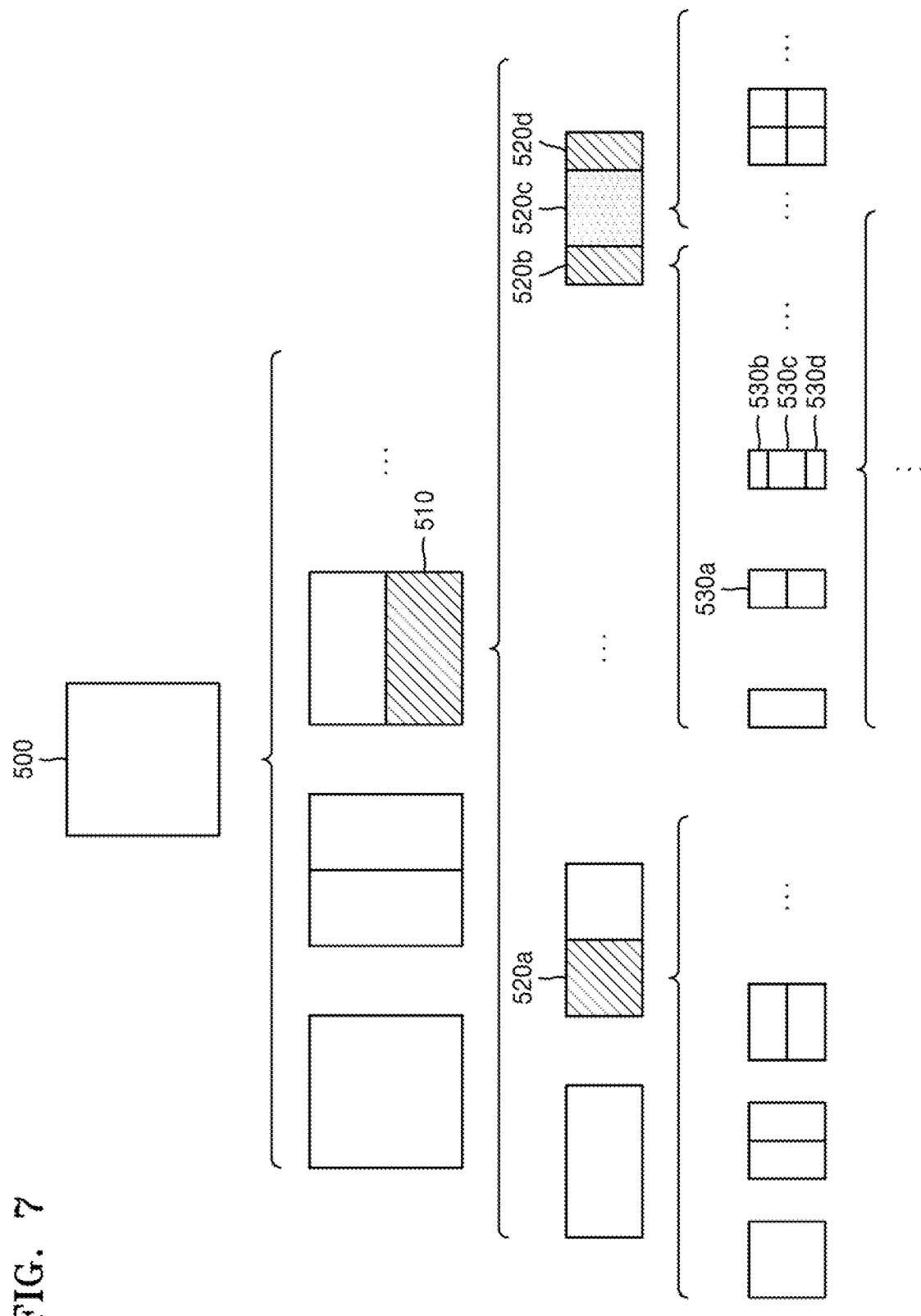
FIG. 7 shows a process, performed by an image decoding apparatus, of splitting a coding unit on the basis of at least one from among block shape information and split shape mode information, according to an embodiment.

FIG. 7 illustrates a process, performed by the image decoding apparatus 100, of splitting a coding unit based on at least one of block shape information and information about a split shape mode, according to an embodiment.

According to an embodiment, the image decoding apparatus 100 may determine to split or not to split a square first coding unit 500 into coding units, based on at least one of the block shape information and the information about the split shape mode. According to an embodiment, when the information about the split shape mode indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on at least one of the block shape information and the information about the split shape mode. Referring to FIG. 7, the image decoding apparatus 100 may or may not split the non-square second coding unit 510, which is determined by splitting the first coding unit 500, into one or more third coding units 520a, or 520b, 520c, and 520d based on at least one of the block shape information and the information about the split shape mode. The image decoding apparatus 100 may obtain at least one of the block shape information and the information about the split shape mode, and determine a plurality of various-shaped second coding units (e.g., 510) by splitting the first coding unit 500, based on the obtained at least one of the block shape information and the information about the split shape mode, and the second coding unit 510 may be split by using the splitting method of the first coding unit 500, based on at least one of the block shape information and the information about the split shape mode. According to an embodiment, when the first coding unit 500 is split into the second coding units 510 based on at least one of the block shape information and the information about the split shape mode of the first coding unit 500, the second coding unit 510 may also be split into the third coding units 520a, or 520b, 520c, and 520d based on at least one of the block shape information and the information about the split shape mode of the second coding unit 510. That is, a coding unit may be recursively split based on at least one of the block shape information and the information about the split shape mode of each coding unit. Therefore, a square coding unit may be determined by splitting a non-square coding unit, and a non-square coding unit may be determined by recursively splitting the square coding unit.

Referring to FIG. 7, a predetermined coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described later through various embodiments.

According to an embodiment, the image decoding apparatus 100 may split each of the third coding units 520a, 520b, 520c and 520d into coding units on the basis of at least one of block shape information and information about a split shape mode. Also, the image decoding apparatus 100 may determine not to split the second coding unit 510 on the basis of the at least one of the block shape information and the information about the split shape mode. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 7, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain at least one of the block shape information and the information about the split shape mode, which is used to split a current coding unit, from a predetermined location in the current coding unit.

Figure 8:
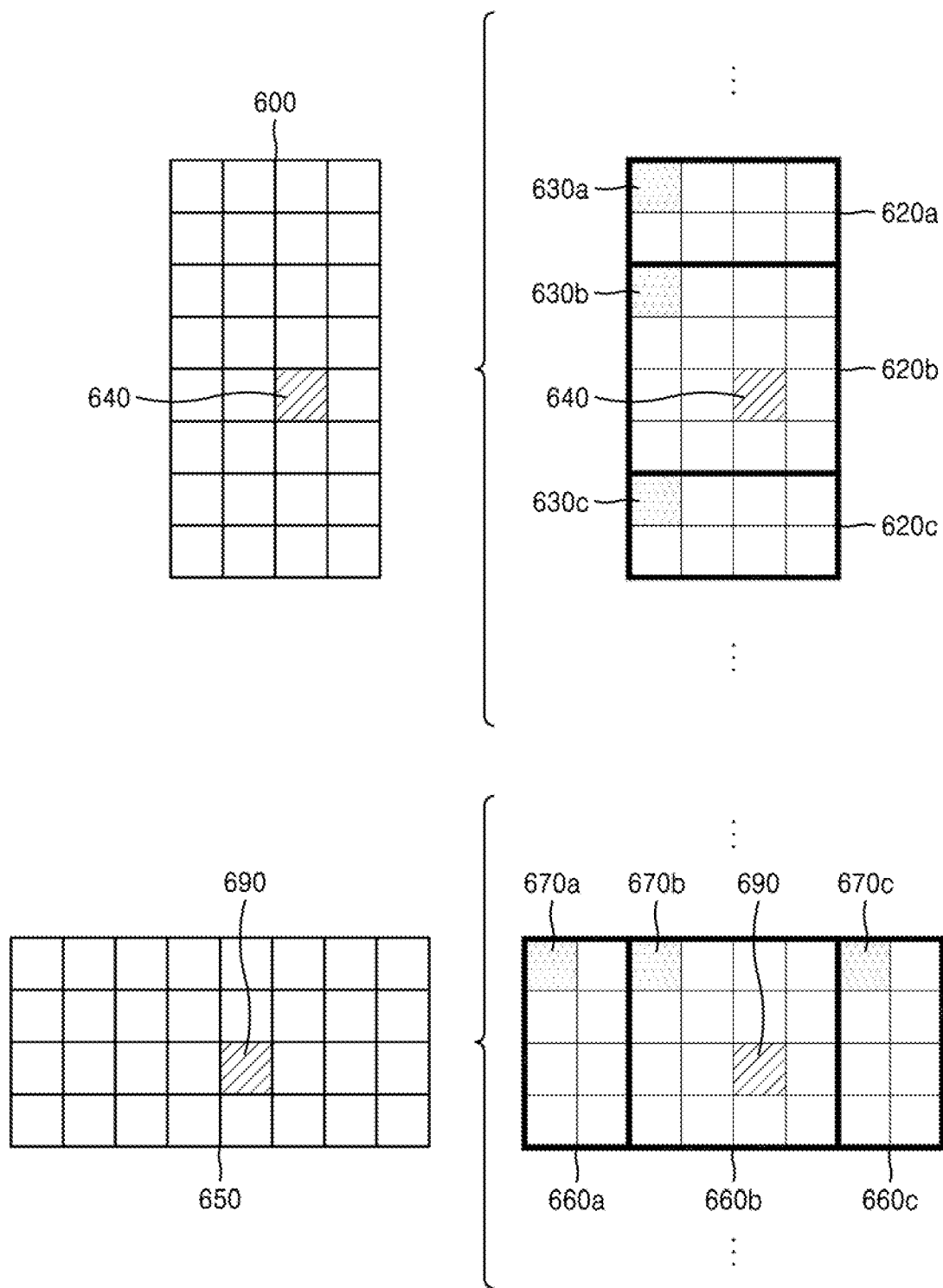
FIG. 8 shows a method, performed by an image decoding apparatus, of determining a predetermined coding unit among an odd number of coding units, according to an embodiment.

FIG. 8 illustrates a method, performed by the image decoding apparatus 100, of determining a predetermined coding unit from among an odd number of coding units, according to an embodiment.

Referring to FIG. 8, at least one of block shape information and information about a split shape mode of a current coding unit 600 or 650 may be obtained from a sample of a predetermined location from among a plurality of samples included in the current coding unit 600 or 650 (e.g., a sample 640 or 690 of a center location). However, the predetermined location in the current coding unit 600, from which at least one of the block shape information and the information about the split shape mode may be obtained, is not limited to the center location in FIG. 8, and may include various locations included in the current coding unit 600 (e.g., upper, lower, left, right, left lower, left lower, right upper, and right lower locations). The image decoding apparatus 100 may obtain at least one of the block shape information and the information about the split shape mode from the predetermined location and determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information representing a location of each of an odd number of coding units to determine a coding unit located at a center of the odd number of coding units. Referring to FIG. 8, the image decoding apparatus 100 may split a current coding unit 600 or a current coding unit 650 to determine an odd number of coding units 620a, 620b and 620c or an odd number of coding units 660a, 660b and 660c. The image decoding apparatus 100 may determine a center coding unit 620b or a center coding unit 660b by using the information about the locations of the odd number of coding units 620a, 620b and 620c or the odd number of coding units 660a, 660b and 660c. For example, the image decoding apparatus 100 may determine the coding unit 620b of the center location by determining the locations of the coding units 620a, 620b, and 620c based on information representing locations of predetermined samples included in the coding units 620a, 620b, and 620c. In detail, the image decoding apparatus 100 may determine the coding unit 620b at the center location by determining the locations of the coding units 620a, 620b, and 620c based on information representing locations of left upper samples 630a, 630b, and 630c of the coding units 620a, 620b, and 620c.

According to an embodiment, the information representing the locations of the left upper samples 630a, 630b, and 630c, which are included in the coding units 620a, 620b, and 620c, respectively, may include information about locations or coordinates of the coding units 620a, 620b, and 620c in a picture. According to an embodiment, the information representing the locations of the left upper samples 630a, 630b, and 630c, which are included in the coding units 620a, 620b, and 620c, respectively, may include information representing widths or heights of the coding units 620a, 620b, and 620c included in the current coding unit 600, and the widths or heights may correspond to information representing differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information representing the location of the left upper sample 630a of the upper coding unit 620a may include coordinates (xa, ya), information representing the location of the left upper sample 630b of the center coding unit 620b may include coordinates (xb, yb), and information representing the location of the left upper sample 630c of the lower coding unit 620c may include coordinates (xc, yc). The image decoding apparatus 100 may determine the center coding unit 620b by using the coordinates of the left upper samples 630a, 630b, and 630c which are included in the coding units 620a, 620b, and 620c, respectively. For example, when the coordinates of the left upper samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the left upper samples 630a, 630b, and 630c may include coordinates indicating absolute locations in the picture, or may use coordinates (dxb, dyb) indicating a relative location of the left upper sample 630b of the center coding unit 620b and coordinates (dxc, dyc) indicating a relative location of the left upper sample 630c of the lower coding unit 620c with reference to the location of the left upper sample 630a of the upper coding unit 620a. A method of determining a coding unit at a predetermined location by using coordinates of a sample included in the coding unit, as information representing a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information representing the location of the left upper sample 630a of the upper coding unit 620a, the coordinates (xb, yb) that is the information representing the location of the left upper sample 630b of the center coding unit 620b, and the coordinates (xc, yc) that is the information representing the location of the left upper sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine a width of the upper coding unit 620a as a width of the current coding unit 600. The image decoding apparatus 100 may determine a height of the upper coding unit 620a as yb-ya. According to an embodiment, the image decoding apparatus 100 may determine a width of the center coding unit 620b as a width of the current coding unit 600. The image decoding apparatus 100 may determine a height of the center coding unit 620b as yc-yb. According to an embodiment, the image decoding apparatus 100 may determine the width or height of the lower coding unit 620c by using the width or height of the current coding unit 600 or the widths or heights of the upper and center coding units 620a and 620b. The image decoding apparatus 100 may determine a coding unit, which has a size different from that of the others, based on the determined widths and heights of the coding units 620a to 620c. Referring to FIG. 8, the image decoding apparatus 100 may determine the center coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine a width or height of each of the coding units 660a, 660b and 660c by using coordinates (xd, yd) being information representing a location of a left upper sample 670a of a left coding unit 660a, coordinates (xe, ye) being information representing a location of a left upper sample 670b of the center coding unit 660b, and coordinates (xf, yf) being information representing a location of a left upper sample 670c of the right coding unit 660c. The image decoding apparatus 100 may determine a size of each of the coding units 660a, 660b and 660c by using the coordinates (xd, yd), (xe, ye) and (xf, yf) representing the locations of the coding units 660a, 660b and 660c.

According to an embodiment, the image decoding apparatus 100 may determine a width of the left coding unit 660a as xe-xd. The image decoding apparatus 100 may determine a height of the left coding unit 660a as a height of the current coding unit 650. According to an embodiment, the image decoding apparatus 100 may determine a width of the center coding unit 660b as xf-xe. The image decoding apparatus 100 may determine a height of the center coding unit 660b as a height of the current coding unit 600. According to an embodiment, the image decoding apparatus 100 may determine a width or height of a right coding unit 660c by using the width or height of the current coding unit 650 and the widths and heights of the left coding unit 660a and the center coding unit 660b. The image decoding apparatus 100 may determine a coding unit having a size that is different from those of the other coding units on the basis of the determined widths and heights of the coding units 660a, 660b and 660c. Referring to FIG. 6, the image decoding apparatus 100 may determine the center coding unit 660b having a size that is different from those of the left coding unit 660a and the right coding unit 660c, as a coding unit of a predetermined location. However, the process of determining a coding unit having a size that is different from those of the other coding units in the image decoding apparatus 100 is an embodiment of determining a coding unit of a predetermined location by using a size of a coding unit determined on the basis of sample coordinates. Therefore, various processes of determining a coding unit of a predetermined location by comparing sizes of coding units determined according to predetermined sample coordinates may be used.

However, locations of samples considered to determine locations of coding units are not limited to the above-described left upper locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information representing respective locations of an even number of coding units, to determine the coding unit at the predetermined location from among the even number of coding units. The image decoding apparatus 100 may determine the even number of coding units by splitting (binary-splitting) the current coding unit and determine the coding unit at the predetermined location by using information about the locations of the even number of coding units. An operation related thereto may correspond to the operation of determining a coding unit at a predetermined location (e.g., a center location) from among an odd number of coding units, which has been described in detail above in relation to FIG. 8, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and information about a split shape mode, which is stored in a sample included in a center coding unit, in a splitting operation to determine a coding unit at a center location from among the plurality of coding units determined by splitting the current coding unit.

Referring to FIG. 8, the image decoding apparatus 100 may split the current coding unit 600 into a plurality of coding units 620a, 620b, and 620c based on at least one of the block shape information and the information about the split shape mode, and may determine the coding unit 620b at a center location from among the plurality of the coding units 620a, 620b, and 620c. Furthermore, the image decoding apparatus 100 may determine the coding unit 620b at the center location, in consideration of a location from which at least one of the block shape information and the information about the split shape mode is obtained. That is, at least one of the block shape information and the information about the split shape mode of the current coding unit 600 may be obtained from the sample 640 at a center location of the current coding unit 600 and, when the current coding unit 600 is split into the plurality of coding units 620a, 620b, and 620c based on at least one of the block shape information and the information about the split shape mode, the coding unit 620b including the sample 640 may be determined as the coding unit at the center location. However, information used to determine the coding unit at the center location is not limited to at least one of the block shape information and the information about the split shape mode, and various types of information may be used to determine the coding unit at the center location.

According to an embodiment, predetermined information for identifying the coding unit at the predetermined location may be obtained from a predetermined sample included in a coding unit to be determined. Referring to FIG. 8, the image decoding apparatus 100 may use at least one of the block shape information and the information about the split shape mode, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, determine the coding unit 620b including a sample, from which predetermined information (e.g., at least one of the block shape information and the information about the split shape mode) may be obtained, from among the plurality of coding units 620a, 620b, and 620c determined by splitting the current coding unit 600, and may put a predetermined restriction on the coding unit 620b. Referring to FIG. 8, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information may be obtained.

According to an embodiment, when the current coding unit is split into a plurality of coding units, the image decoding apparatus 100 may use at least one of the block shape information and the information about the split shape mode to determine a coding unit at a predetermined location from among the plurality of coding units. According to an embodiment, the image decoding apparatus 100 may obtain at least one of the block shape information and the information about the split shape mode from a sample at a predetermined location in a coding unit, and split the plurality of coding units, which are generated by splitting the current coding unit, by using at least one of the information about the split shape mode and the information about the split shape mode, which is obtained from the sample of the predetermined location in each of the plurality of coding units. That is, a coding unit may be recursively split based on at least one of the block shape information and the information about the split shape mode, which is obtained from the sample at the predetermined location in each coding unit. An operation of recursively splitting a coding unit has been described above in relation to FIG. 7, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 9:
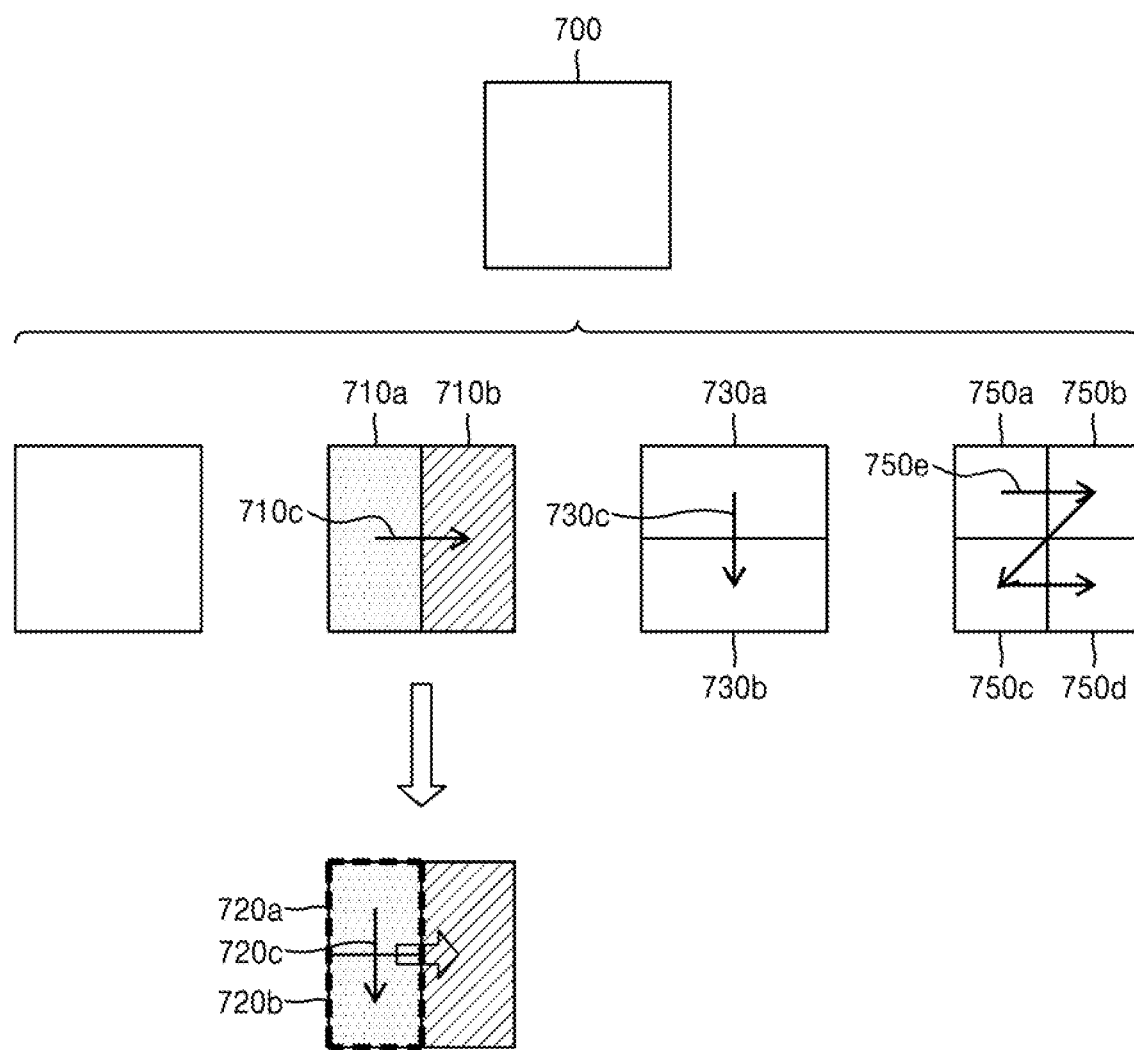
FIG. 9 shows an order in which, when an image decoding apparatus splits a current coding unit to determine a plurality of coding units, the plurality of coding units are processed, according to an embodiment.

FIG. 9 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on block shape information and information about a split shape mode.

Referring to FIG. 9, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750e).

According to an embodiment, the image decoding apparatus 100 may recursively split coding units. Referring to FIG. 9, the image decoding apparatus 100 may determine the plurality of coding units 710a and 710b, 730a and 730b, or 750a to 750d by splitting the first coding unit 700, and recursively split each of the determined plurality of coding units 710b, 730a and 730b, or 750a to 750d. A splitting method of the plurality of coding units 710b, 730a and 730b, or 750a to 750d may correspond to a splitting method of the first coding unit 700. As such, each of the plurality of coding units 710b, 730a and 730b, or 750a to 750d may be independently split into a plurality of coding units. Referring to FIG. 9, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 10:
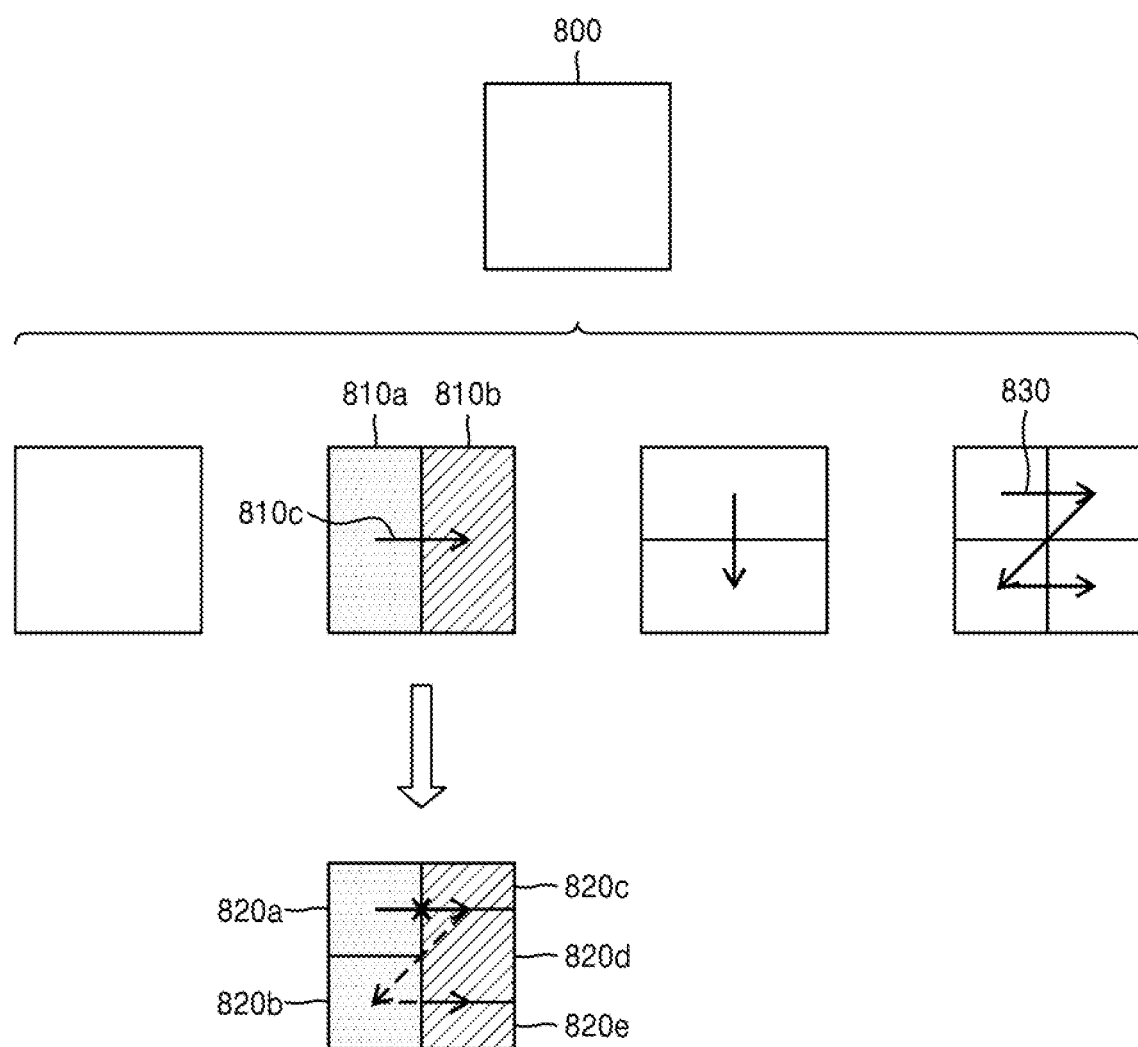
FIG. 10 shows a process in which an image decoding apparatus determines that a current coding unit is split into an odd number of coding units, when the current coding unit is unable to be processed in a predetermined order, according to an embodiment.

FIG. 10 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained block shape information and information about a split shape mode. Referring to FIG. 10, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 10, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information and the information about the split shape mode. For example, the right second coding unit 810b among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c to 820e included in the first coding unit 800 satisfy the condition for processing in the predetermined order, and the condition relates to whether at least one of a width and height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 11:
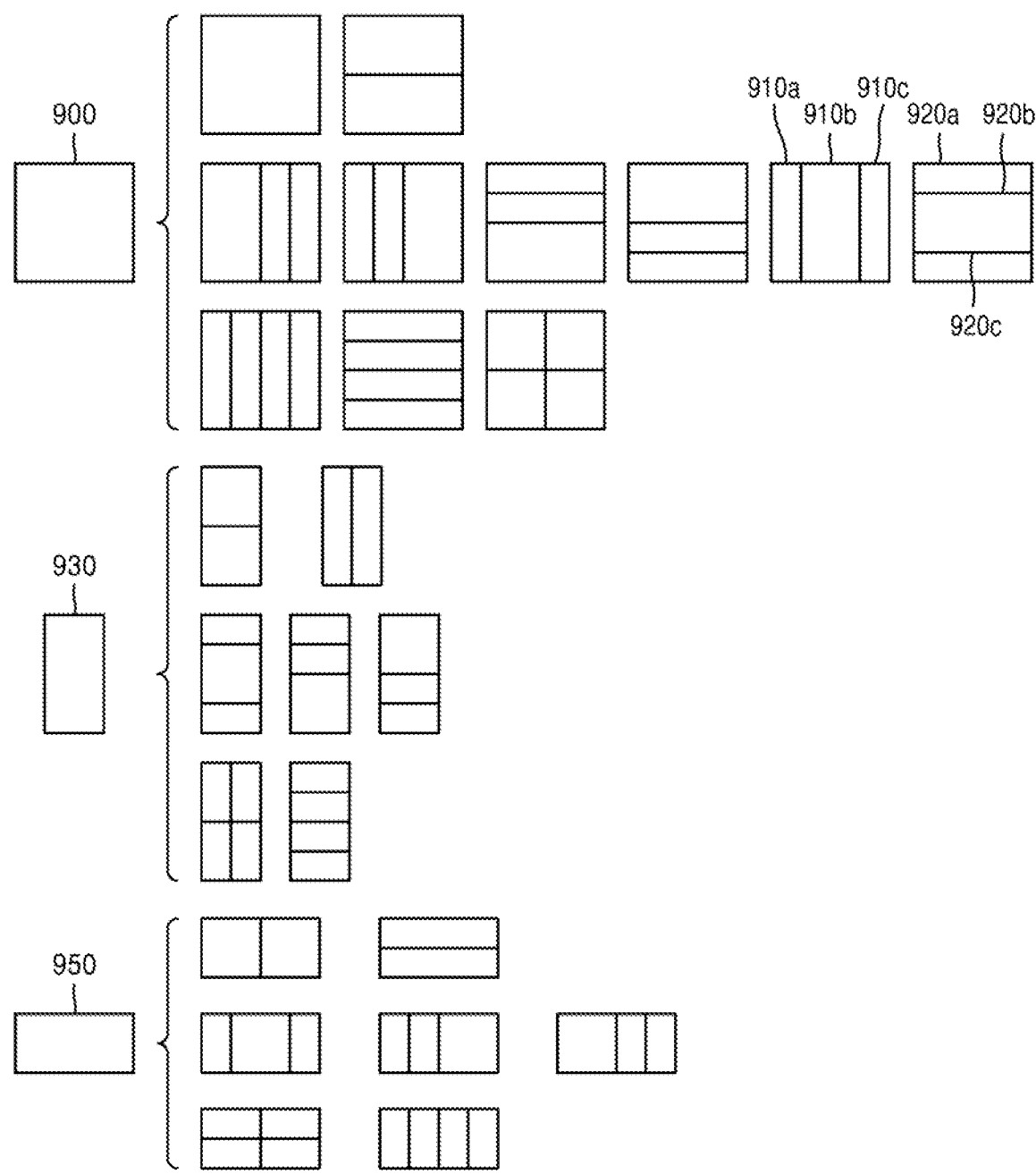
FIG. 11 shows a process in which an image decoding apparatus splits a first coding unit to determine at least one coding unit, according to an embodiment.

FIG. 11 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and information about a split shape mode, which is obtained through an obtainer (not shown). The square first coding unit 900 may be split into four square coding units, or may be split into a plurality of non-square coding units. For example, referring to FIG. 9, when the block shape information indicates that the first coding unit 900 has a square shape and the information about the split shape mode indicates to split the first coding unit 900 into non-square coding units, the image decoding apparatus 100 may split the first coding unit 900 into a plurality of non-square coding units. In detail, when the information about the split shape mode indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is split in half along a boundary of the second coding units 910a, 910b, 910c, 920a, 920b, and 920c. Referring to FIG. 11, because boundaries of the second coding units 910a, 910b, and 910c determined by splitting the square first coding unit 900 in a vertical direction do not split the height of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 11, the image decoding apparatus 100 may split the square first coding unit 900 or a non-square first coding unit 930 or 950 into various-shaped coding units.

Figure 12:
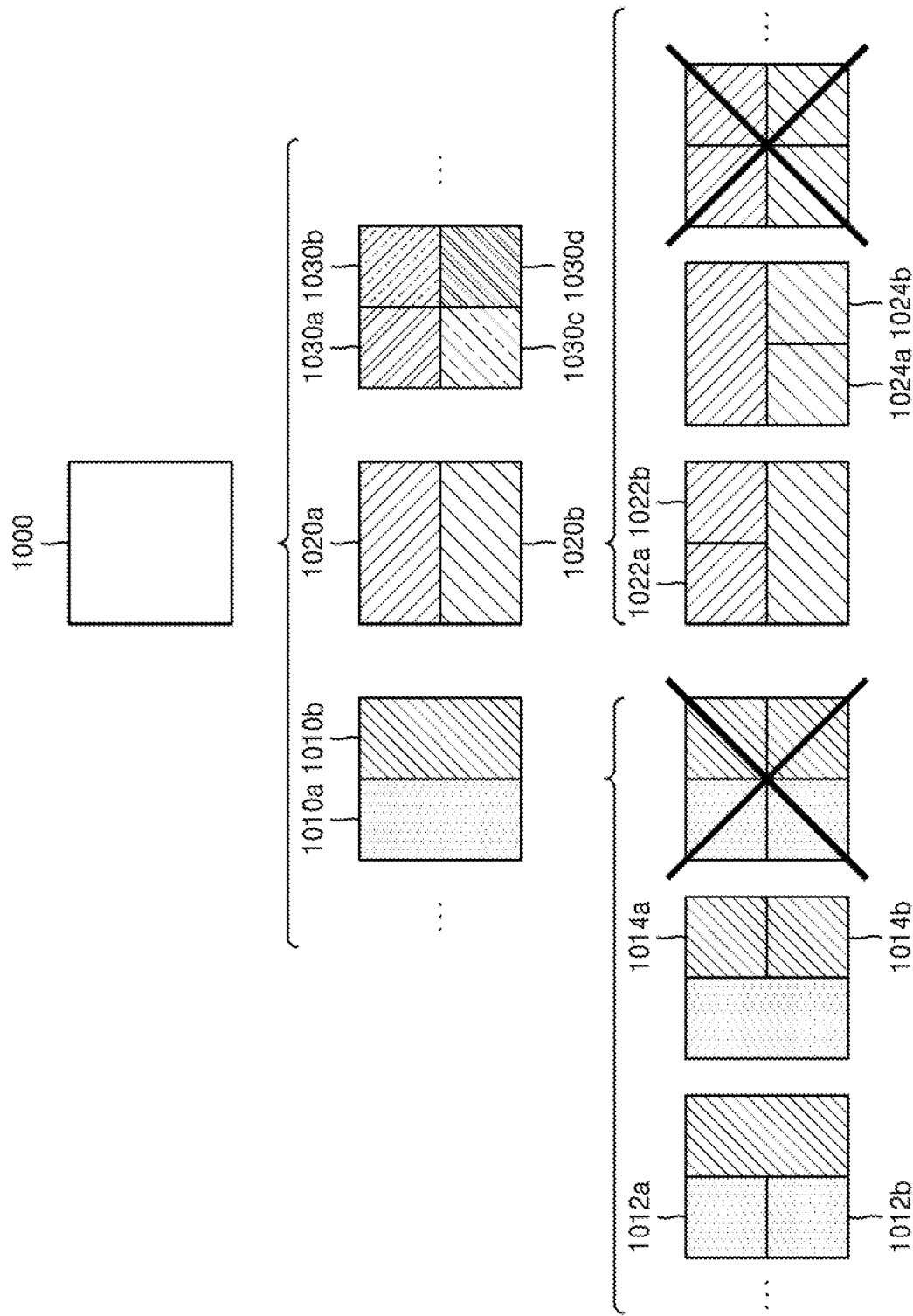
FIG. 12 illustrates that a shape into which a second coding unit is splittable is restricted when a second coding unit of a non-square shape determined as an image decoding apparatus splits a first coding unit satisfies a predetermined condition, in an image decoding apparatus, according to an embodiment.

FIG. 12 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a and 1010b or 1020a and 1020b, based on at least one of block shape information and information about a split shape mode, which is obtained through an obtainer (not shown). The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on at least one of the block shape information and the information about the split shape mode of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on at least one of the block shape information and the information about the split shape mode, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 13:
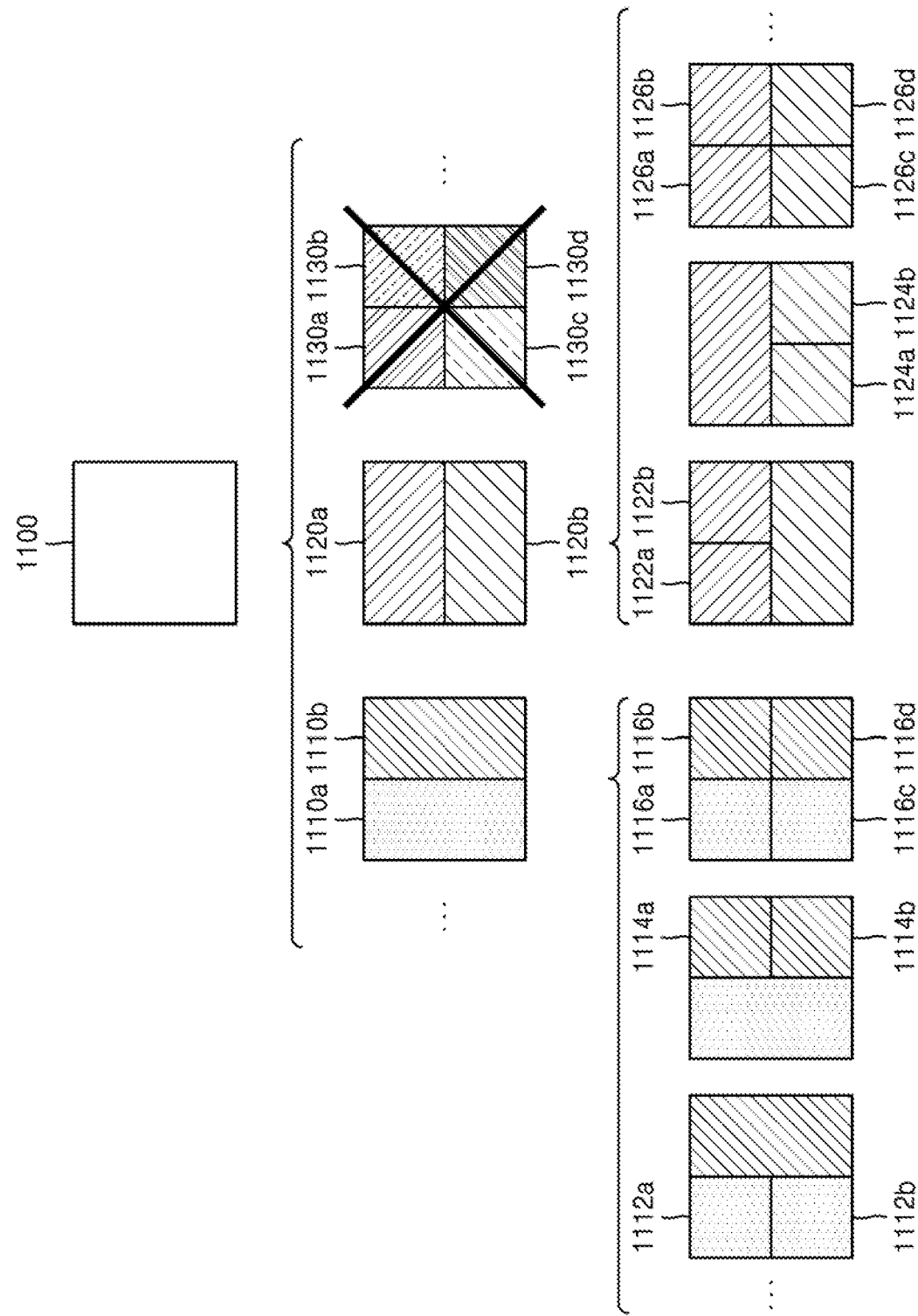
FIG. 13 shows a process, performed by an image decoding apparatus, of splitting a coding unit of a square shape, when information about a split shape mode is unable to represent that the coding unit of a square shape is split into four coding units of a square shape, according to an embodiment.

FIG. 13 illustrates a process, performed by the image decoding apparatus 100, of splitting a square coding unit when information about a split shape mode is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and information about a split shape mode. The information about a split shape mode may include information about various methods of splitting a coding unit but, the information about various splitting methods may not include information for splitting a coding unit into four square coding units. According to such information about the split shape mode, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the information about the split shape mode.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on at least one of the block shape information and the information about the split shape mode.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 14:
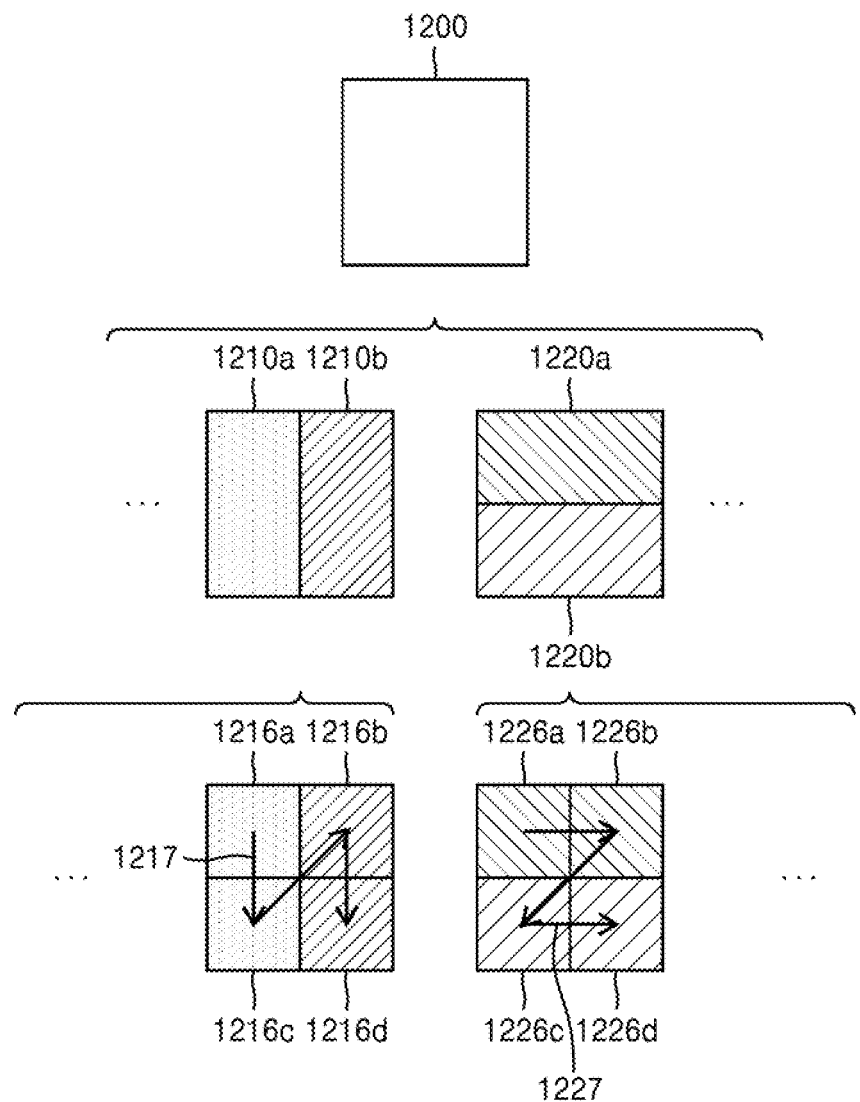
FIG. 14 illustrates that a processing order between a plurality of coding units may be changed depending on a process of splitting a coding unit, according to an embodiment.

FIG. 14 illustrates that a processing order between a plurality of coding units may be changed depending on a process of splitting a coding unit, according to an embodiment.

According to an embodiment, the image decoding apparatus 100 may split a first coding unit 1200, based on block shape information and information about a split shape mode. When the block shape information indicates a square shape and the information about the split shape mode indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 14, the non-square second coding units 1210a and 1210b or 1220a and 1220b determined by splitting the first coding unit 1200 in only a horizontal direction or vertical direction may be independently split based on the block shape information and the information about the split shape mode of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b has been described above in relation to FIG. 13, and thus detailed descriptions thereof will not be provided herein.

According to an embodiment, the image decoding apparatus 100 may process coding units in a predetermined order. An operation of processing coding units in a predetermined order has been described above in relation to FIG. 9 and thus detailed descriptions thereof will not be provided herein. Referring to FIG. 14, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 14, the square third coding units 1216a, 1216b, 1216c, and 1216d, and 1226a, 1226b, 1226c, and 1226d may be determined by splitting the second coding units 1210a and 1210b, and 1220a and 1920b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on at least one of the block shape information and the information about the split shape mode, the image decoding apparatus 100 may process a plurality of coding units in different orders even when the coding units are eventually determined to be the same shape.

FIG. 15 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 15, according to an embodiment, the image decoding apparatus 100 may determine a second coding unit 1302 and a third coding unit 1304 of deeper depths by splitting a square first coding unit 1300 based on block shape information representing a square shape (for example, the block shape information may be expressed as '0: SQUARE'). Assuming that the size of the square first coding unit 1300 is 2N×2N, the second coding unit 1302 determined by splitting a width and height of the first coding unit 1300 to ½ may have a size of N×N. Furthermore, the third coding unit 1304 determined by splitting a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information representing a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 16:
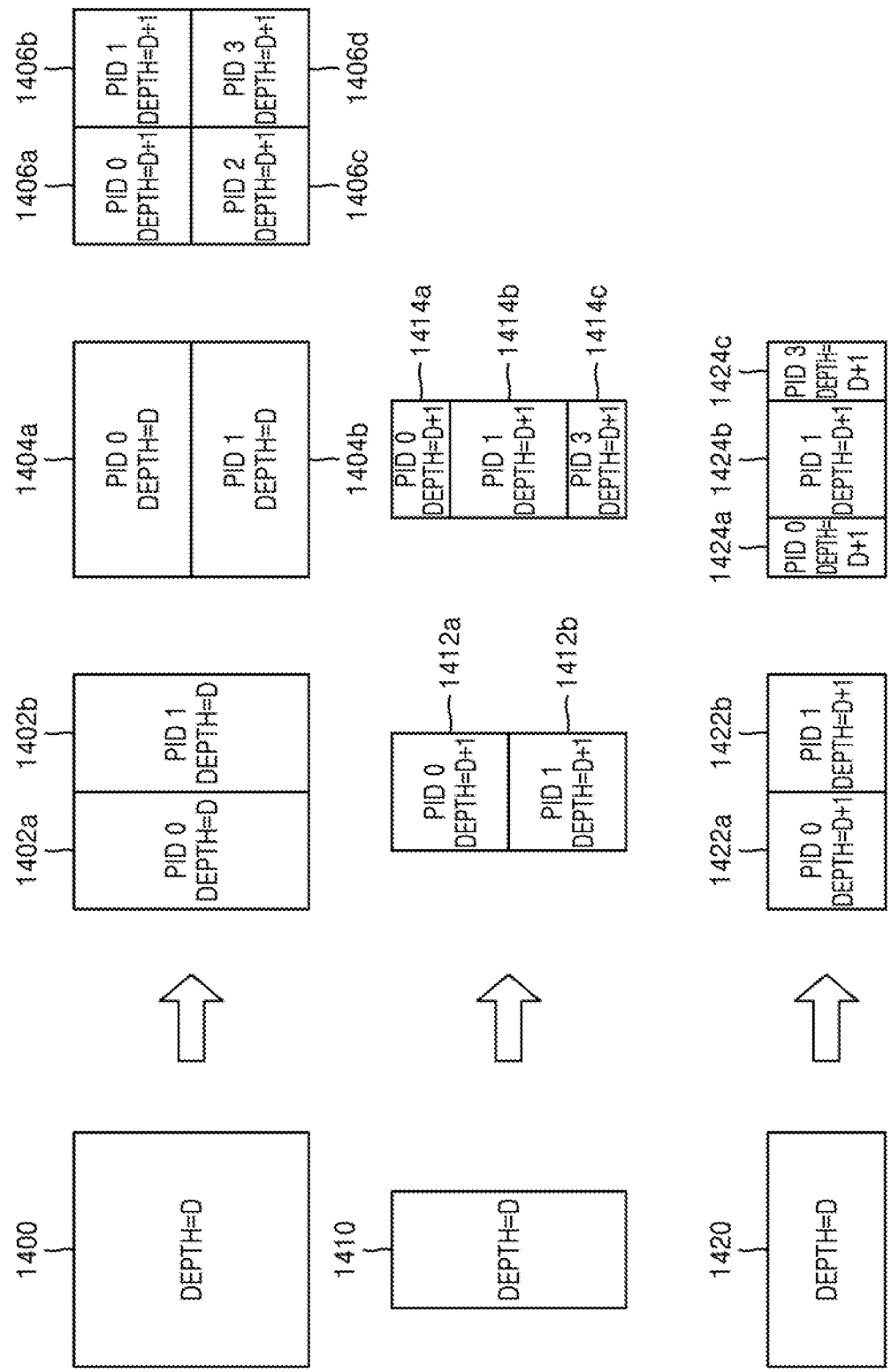
FIG. 16 illustrates depths that are determinable based on shapes and sizes of coding units, and part indexes (PIDs) that are for distinguishing the coding units, according to an embodiment.

FIG. 16 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 16, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on information about a split shape mode. That is, the image decoding apparatus 100 may determine the second coding units 1402a and 1402b, 1404a and 1404b, and 1406a, 1406b, 1406c, and 1406d, based on the information about the split shape mode of the first coding unit 1400.

According to an embodiment, a depth of the second coding units 1402a and 1402b, 1404a and 1404b, and 1406a, 1406b, 1406c, and 1406d, which are determined based on the information about the split shape mode of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the information about the split shape mode, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the information about the split shape mode. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the information about the split shape mode.

According to an embodiment, a depth of the second coding units 1412a and 1412b, and 1414a, 1414b, and 1414c, or 1422a and 1422b, and 1424a, 1424b, and 1424c, which are determined based on the information about the split shape mode of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the information about the split shape mode. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 16, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 16, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs to identify respective coding units. According to an embodiment, the PID may be obtained from a sample of a predetermined location of each coding unit (e.g., a left upper sample).

According to an embodiment, the image decoding apparatus 100 may determine a coding unit at a predetermined location from among the split coding units, by using the PIDs for distinguishing the coding units. According to an embodiment, when the information about the split shape mode of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a center value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 16, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the information about the split shape mode indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 17:
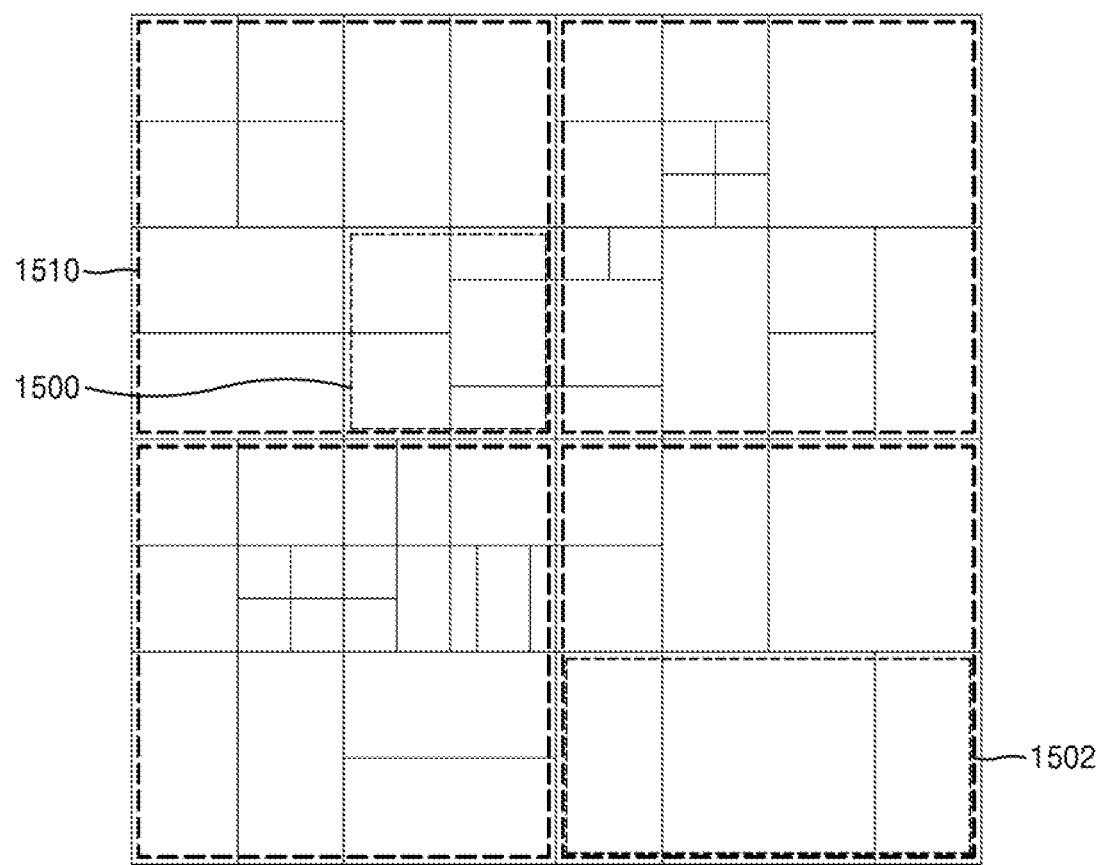
FIG. 17 illustrates that a plurality of coding units are determined based on a plurality of predetermined data units included in a picture, according to an embodiment.

FIG. 17 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and information about a split shape mode. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as multipliers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the information about the split shape mode of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the information about the split shape mode with reference to the determined reference data unit.

Referring to FIG. 17, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 6. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, an obtainer (not shown) may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the information about the split shape mode according to various embodiments.

Figure 18:
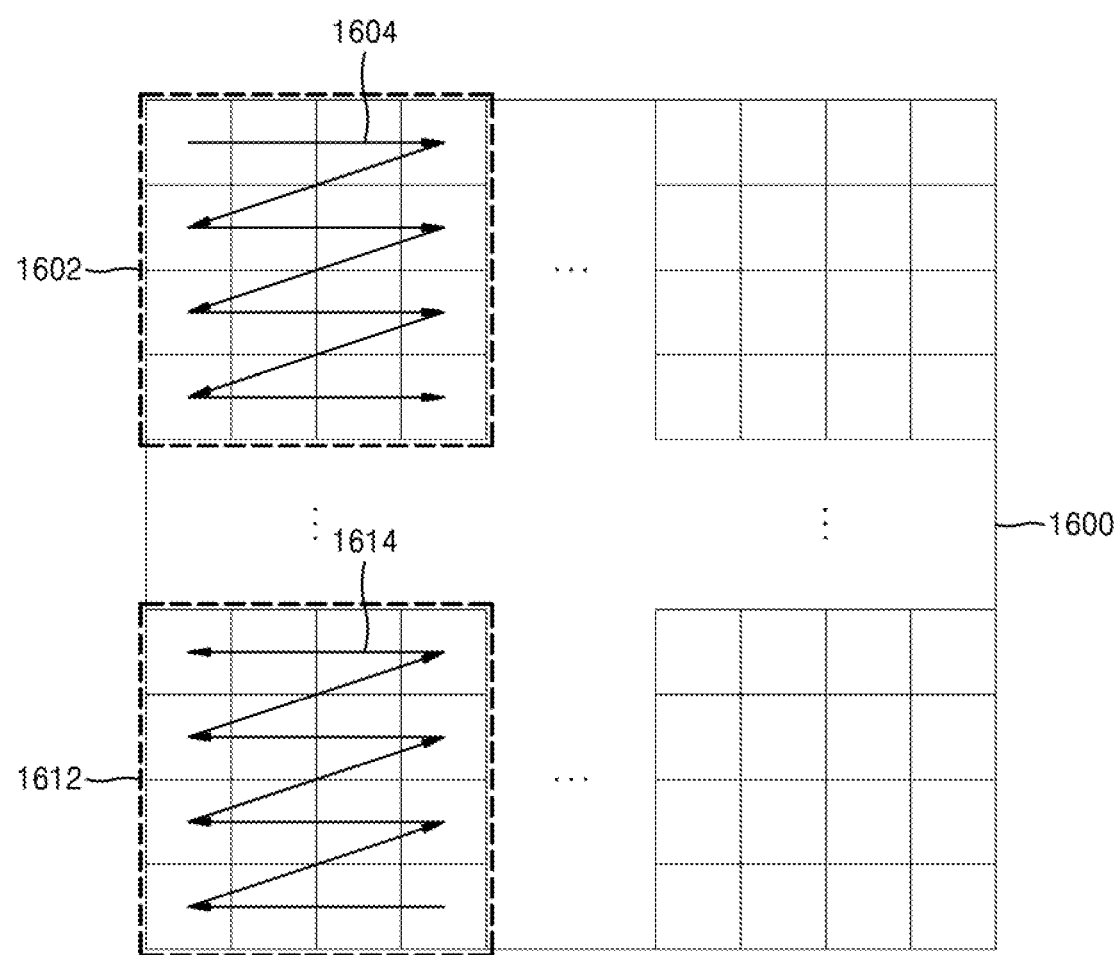
FIG. 18 illustrates a processing block serving as a criterion for determining a determination order of reference coding units included in a picture, according to an embodiment.

FIG. 18 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, an obtainer (not shown) of the image decoding apparatus 100 may obtain the processing block size information from the bitstream according to each specific data unit. For example, the processing block size information may be obtained from the bitstream in a data unit such as an image, sequence, picture, slice, or slice segment. That is, an obtainer (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 18, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, an obtainer (not shown) may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, an obtainer (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 18, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information representing the shape of a current coding unit or information about a split shape mode indicating a splitting method of the current coding unit, from the bitstream, and may use the obtained information. The block shape information or the information about the split shape mode may be included in the bitstream related to various data units. For example, the image decoding apparatus 100 may use the block shape information or the information about the split shape mode included in a sequence parameter set, a picture parameter set, a video parameter set, a slice header, or a slice segment header. Furthermore, the image decoding apparatus 100 may obtain, from the bitstream, a syntax element corresponding to the block shape information or the information about the split shape mode according to each largest coding unit, each reference coding unit, or each processing block, and may use the obtained syntax element.

Up to this point, various embodiments have been described. It will be apparent that those skilled in the art may readily make various modifications thereto without changing the essential features of the disclosure. Thus, it should be understood that the disclosed embodiments described above are merely for illustrative purposes and not for limitation purposes in all aspects. The scope of the disclosure is defined in the accompanying claims rather than the above detailed description, and it should be noted that all differences falling within the claims and equivalents thereof are included in the scope of the disclosure.

Meanwhile, the embodiments of the disclosure may be written as a program that is executable on a computer, and implemented on a general-purpose digital computer that operates a program using a computer-readable recording medium. The computer-readable recording medium may include a storage medium, such as a magnetic storage medium (for example, ROM, a floppy disk, a hard disk, etc.) and an optical reading medium (for example, CD-ROM, DVD, etc.).

The invention claimed is:
1. An image decoding method comprising:
splitting an upper block included in an image based on information about at least one of a split type and a split direction of the upper block to determine at least one lower block from the upper block;
if a size of a lower block among the at least one lower block is equal to a predetermined size, setting an intra prediction mode as a prediction mode of the lower block without obtaining information indicating the prediction mode of the lower block from a bitstream;
performing an intra prediction on the lower block among the at least one lower block on the basis of the intra prediction mode set as the prediction mode of the lower block; and
reconstructing the lower block among the at least one lower block,
wherein:
the split type represents one of binary-split, tri-split, and quad-split.
2. An image decoding apparatus comprising:
at least processor configured to split an upper block included in an image based on information about at least one of a split type and a split direction of the upper block to determine at least one lower block from the upper block, if a size of a lower block among the at least one lower block is equal to a predetermined size, to set an intra prediction mode as a prediction mode of the lower block without obtaining information indicating the prediction mode of the lower block from a bitstream, to perform an intra prediction on the lower block among the at least one lower block on the basis of the intra prediction mode set as the prediction mode of the lower block, and to reconstruct the lower block among the at least one lower block,
wherein:
the split type represents one of binary-split, tri-split, and quad-split.
3. An image encoding method comprising:
split an upper block included in an image based on at least one of a split type and a split direction of the upper block to determine at least one lower block from the upper block;
if a size of a lower block among the at least one lower block is equal to a predetermined size, setting an intra prediction mode as a prediction mode of the lower block without generating information indicating the prediction mode of the lower block to be included in a bitstream;
performing an intra prediction on the lower block among the at least one lower block on the basis of the intra prediction mode set as the prediction mode of the lower block; and
encoding the lower block among the at least one lower block on the basis of a prediction block of the lower block among the at least one lower block, wherein:
the split type represents one of binary-split, tri-split, and quad-split.

\* \* \* \* \*